(12) United States Patent
Chennault

(10) Patent No.: US 7,553,410 B1
(45) Date of Patent: Jun. 30, 2009

(54) SEPTAGE TREATMENT SYSTEM

(75) Inventor: Derrick O. Chennault, Huron, OH (US)

(73) Assignee: Eastwood Research, Inc., Huron, OH (US)

( * ) Notice: Subject to any disclaimer, the term of this patent is extended or adjusted under 35 U.S.C. 154(b) by 0 days.

(21) Appl. No.: 12/151,049

(22) Filed: May 2, 2008

(51) Int. Cl.
C02F 3/00 (2006.01)

(52) U.S. Cl. .................... 210/150; 210/151; 210/221.2; 210/253; 210/258; 210/259; 210/260; 210/261; 210/263; 210/532.1

(58) Field of Classification Search ......... 210/150–151, 210/221.2, 253, 258, 259–261, 263, 532.1
See application file for complete search history.

(56) References Cited

U.S. PATENT DOCUMENTS

| | | | |
|---|---|---|---|
| 228,542 A | 6/1880 | Lister | |
| 986,180 A | 3/1911 | Koenig | |
| 1,381,802 A | 6/1921 | Copelin | |
| 1,536,894 A | 5/1925 | Lillie | |
| 3,770,623 A | 11/1973 | Seidel | |
| 3,892,666 A * | 7/1975 | Quast | 210/520 |
| 4,209,388 A | 6/1980 | DeFraites | |
| 4,333,837 A | 6/1982 | Plosz et al. | |
| 4,342,830 A | 8/1982 | Holloway | |
| 4,394,270 A | 7/1983 | Hartmann et al. | |
| 4,540,495 A | 9/1985 | Holloway | |
| 4,554,002 A | 11/1985 | Nicholson | |
| 4,655,925 A | 4/1987 | Tabata et al. | |
| 4,678,582 A | 7/1987 | Lavigne | |
| 4,781,842 A | 11/1988 | Nicholson | |
| 4,829,678 A | 5/1989 | Glorioso | |
| 4,839,051 A | 6/1989 | Higa | |
| 4,844,351 A | 7/1989 | Holloway | |
| 4,852,269 A | 8/1989 | Glorioso | |
| 4,902,431 A | 2/1990 | Nicholson et al. | |
| 4,919,814 A | 4/1990 | Carnahan et al. | |
| 4,933,076 A | 6/1990 | Oshima et al. | |
| 4,956,926 A | 9/1990 | Glorioso | |
| 4,974,781 A | 12/1990 | Placzek | |
| 4,975,195 A | 12/1990 | Urbani | |
| 4,989,344 A | 2/1991 | Glorioso | |
| 4,999,103 A | 3/1991 | Bogart | |
| 5,013,458 A | 5/1991 | Christy, Sr. et al. | |
| 5,078,882 A | 1/1992 | Northrop | |
| 5,110,459 A | 5/1992 | Baxter | |
| 5,116,363 A | 5/1992 | Romweber et al. | |
| 5,119,994 A | 6/1992 | Placzek | |
| 5,135,664 A | 8/1992 | Burnham | |

(Continued)

Primary Examiner—Chester T Barry
(74) Attorney, Agent, or Firm—Roger A. Gilcrest

(57) ABSTRACT

The present invention generally includes a septage treatment system comprising: (a) a primary treatment process system comprising: (1) a receiving station to pump the septage from a vehicle; (2) equalization tank(s) to receive septage from the receiving station; and (3) two or more mixing and odor control tanks to generate waste activated sludge; (b) a primary settling tank to generate waste activated sludge; (c) a secondary treatment process system comprising: (1) aeration tank(s) to receive waste activated sludge from the primary treatment process system and to generate water effluent; and (d) a tertiary treatment process system comprising: (1) wetland ditch(es) to receive water effluent from the aeration tank and to generate filtered water effluent; (2) wetland pond(s) to receive filtered water effluent from the wetland ditch(es) and to generate filtered water effluent; and (3) an aquaculture hydroponics and sand bed greenhouse to generate filtered water effluent.

18 Claims, 18 Drawing Sheets

U.S. PATENT DOCUMENTS

| | | |
|---|---|---|
| 5,137,625 A | 8/1992 | Wolverton |
| 5,174,897 A | 12/1992 | Wengrzynek |
| 5,186,840 A | 2/1993 | Christy et al. |
| 5,190,226 A | 3/1993 | Holloway |
| 5,196,043 A | 3/1993 | Wurtz |
| 5,229,011 A | 7/1993 | Christy, Sr. et al. |
| 5,253,764 A | 10/1993 | Gement |
| 5,275,733 A | 1/1994 | Burnham |
| 5,288,146 A | 2/1994 | Baldwin |
| 5,300,438 A | 4/1994 | Augspurger et al. |
| 5,337,496 A | 8/1994 | Glorioso |
| 5,346,616 A | 9/1994 | Christy, Sr. et al. |
| 5,361,994 A | 11/1994 | Holloway |
| 5,401,402 A | 3/1995 | Christy et al. |
| 5,405,536 A | 4/1995 | Christy |
| 5,407,809 A | 4/1995 | Finn |
| 5,417,861 A | 5/1995 | Burnham |
| 5,427,650 A | 6/1995 | Holloway |
| 5,433,844 A | 7/1995 | Christy |
| 5,540,391 A | 7/1996 | Anderson |
| 5,543,050 A | 8/1996 | Roshanravan |
| 5,554,279 A | 9/1996 | Christy |
| 5,556,445 A | 9/1996 | Quinn et al. |
| 5,618,442 A | 4/1997 | Christy |
| 5,679,262 A | 10/1997 | Girovich et al. |
| 5,681,481 A | 10/1997 | Christy et al. |
| 5,744,041 A | 4/1998 | Grove |
| 5,783,073 A | 7/1998 | Christy et al. |
| 5,843,507 A | 12/1998 | Harvey et al. |
| 5,851,404 A | 12/1998 | Christy et al. |
| 5,853,450 A | 12/1998 | Burnham et al. |
| 5,916,448 A | 6/1999 | Fergen |
| 5,960,810 A | 10/1999 | Douglas |
| 5,972,227 A | 10/1999 | Peltier et al. |
| 6,015,496 A | 1/2000 | Khudenko |
| 6,036,918 A | 3/2000 | Kowanko |
| 6,126,827 A | 10/2000 | Johnson, Jr. et al. |
| 6,315,903 B1 | 11/2001 | Noyes |
| 6,397,492 B1 | 6/2002 | Malley |
| 6,406,627 B1 | 6/2002 | Wallace |
| 6,447,682 B1 | 9/2002 | Flowers |
| 6,558,550 B1 | 5/2003 | Kelly |
| 6,558,555 B1 | 5/2003 | Flowers |
| 6,582,156 B1 | 6/2003 | Flowers et al. |
| 6,652,743 B2 | 11/2003 | Wallace et al. |
| 6,776,914 B2 | 8/2004 | Hickey |
| 6,811,700 B2 * | 11/2004 | Austin et al. ............... 210/602 |
| 6,830,688 B2 | 12/2004 | Austin et al. |
| 6,863,816 B2 | 3/2005 | Austin et al. |
| 6,881,338 B2 | 4/2005 | Austin et al. |
| 6,896,805 B2 | 5/2005 | Austin |
| 6,991,728 B2 | 1/2006 | Ames et al. |
| 7,029,586 B2 | 4/2006 | Austin et al. |
| 7,070,693 B2 | 7/2006 | Kelly |
| 7,087,169 B2 | 8/2006 | Austin |
| 7,097,762 B1 | 8/2006 | Ruocco et al. |
| 7,128,839 B1 | 10/2006 | Flowers et al. |
| 7,147,778 B1 | 12/2006 | DiMassimo et al. |
| 7,169,306 B1 | 1/2007 | Porteous et al. |
| 7,214,317 B2 | 5/2007 | Austin et al. |
| 7,320,752 B2 | 1/2008 | Austin et al. |
| 2002/0127317 A1 | 9/2002 | Hotchkiss et al. |
| 2002/0162795 A1 | 11/2002 | Pollock |
| 2002/0164405 A1 | 11/2002 | Polster |
| 2002/0185456 A1 | 12/2002 | Ward et al. |
| 2003/0070460 A1 | 4/2003 | Logan et al. |
| 2003/0136165 A1 | 7/2003 | Logan et al. |
| 2004/0250700 A1 | 12/2004 | Renaud |
| 2005/0035032 A1 | 2/2005 | McGee |
| 2005/0059849 A1 | 3/2005 | Liu |
| 2006/0086662 A1 | 4/2006 | Ogden |
| 2006/0222463 A1 | 10/2006 | Subbarayan et al. |
| 2008/0093292 A1 * | 4/2008 | Zotter et al. ............... 210/603 |

* cited by examiner

SEPTAGE TREATMENT SYSTEM

CROSS-REFERENCE TO RELATED APPLICATIONS

This application incorporates by reference provisional application entitled SEPTAGE TREATMENT SYSTEM AND METHOD OF TREATING SEPTAGE filed May 2, 2008, now provisional application Ser. No. 61/126,263.

TECHNICAL FIELD

The present invention relates to systems and methods for the treatment of septage, such as that obtained from septic tanks and the like.

BACKGROUND OF THE INVENTION

The present invention relates to systems and methods for treating process material and, more particularly, to systems and methods for treating municipal domestic or septage liquid sanitary waste material, medical waste material, food waste, commercial farm animal waste, reclaimed paper and the like.

Historically, septage waste has been trucked either to conventional publicly owned waste water treatment plants (WWTP) or has been directly applied to farm land.

Direct application of raw septage waste to farmlands has the potential for serious problems. Direct application can contaminate ground water and has a high probability of disease transmission to people via animals and insects.

The activated sludge in a conventional WWTP treats the normal levels of raw residential sanitary waste. When high concentrations of septage waste is trucked in from outside of the WWTP community, the negative impact upon the WWTP plant is threefold: (1) the culture or activated sludge is stressed by the anaerobic high concentration waste which at times could result in final effluent limitation exceeding capacity of the WWTP; (2) by allowing waste that is generated outside of the of WWTP community the useful life of the plant is shortened due to the increase of required treatment capacity (this can lead to premature replacement or expensive expansion of the WWTP); and (3) a public WWTP and private septic hauling business sometimes have incompatible management goals.

U.S. Pat. No. 4,919,814 to Carnahan, et al. discloses a system and method for treating septage (i.e., wastewater collected from septic tanks and similar installations) which utilizes a reactor tank for treating the anaerobic wastewater with an oxygen-containing fluid so as to substantially increase the dissolved oxygen content and thereby render the wastewater aerobic and suitable for input into a municipal wastewater treatment facility. Volatile gases are drawn off from all of the reactor tanks and placed into a treatment tank for a reduction of the bacterial and odor levels by reaction with a chlorine-containing water output of the municipal wastewater treatment facility.

U.S. Pat. No. 5,543,050 to Roshanravan discloses a system that uses both aerobic and anaerobic treatment processes on grease-trap waste contents. The system initially screens the wastewater to remove larger solid-waste matter particles. The wastewater is next anaerobically and aerobically processed. The anaerobic and aerobic processes use dissolved air flotation clarifiers utilizing gas entrained water to remove solid-waste matter from the wastewater. The anaerobic and aerobic processes also use digester apparatus which break down the solid-waste matter of the wastewater. The anaerobic digester uses anaerobic biological processes for breaking down the solid-waste matter while the aerobic digester uses aerobic biological processes. The two by-products of this system, the clarified wastewater and the composted solid-waste matter, are both more ecologically acceptable alternatives than dumping the grease trap contents into a landfill site.

U.S. Pat. No. 6,015,496 to Khudenko, describes a method and apparatus for in-sewer wastewater treatment comprising steps of largely spontaneously growing acidogenic bacteria in sewer lines and providing methanogenic bacteria in those lines. Methanogenic bacteria can be grown using wastewater, solid, or other waste, or other organic feedstock as a substrate. Methanogenic bacteria can be cultivated at a wastewater treatment plant or at other locations in special reactors, or provided from anaerobic wastewater pretreatment plants. Digestion gases can be either vented out or collected and used.

U.S. Pat. No. 6,126,827 to Johnson, Jr., et al. discloses a wastewater treatment system which can be used to treat high-strength septage, sewage and industrial wastewater. The wastewater treatment system consists of three major components. In the first component, solids are separated from the liquid component of the wastewater being treated. The separated solid portion is removed to a composting component wherein it is turned into a commercially useful compost material. The liquid component is subjected to a two part treatment wherein the first part of the treatment is carried out in a sequencing batch reactor and the second part is carried out in at least one reed bed. In an alternative embodiment of the present invention, the various components of the wastewater treatment system are in modular form.

U.S. Pat. No. 6,776,914 to Hickey discloses a process for treating liquid septage and other biosolids having the steps of placing a known amount of liquid septage in a tank, mixing in a sufficient quantity of alkaline material to raise the pH to a desired level, flocculating the septage, storing the pH adjusted septage for a predetermined period of time, thickening the septage, de-watering the septage, and pasteurizing the resultant liquid effluent and de-watered solids cake. The process for treating liquid septage and biosolids disclosed by the current invention meets the Class A vector attractant reduction and pathogen reduction requirements mandated by the U.S. EPA. The end product of septage and other biosolids treated using the process disclosed by the current invention can be sold as fertilizer, and utilized without any additional permits.

U.S. Pat. No. 6,558,550 to Kelly discloses a process and apparatus for the treatment of septage, particularly grease trap waste. The inventive process will convert the septage into biosolids (sludge) and water dischargeable to the environment. The treated septage achieves pathogen reduction, and reduced vector attraction. Treatment of septage by pasteurization causes the destruction of harmful pathogens. Pasteurization of septage having high water content provides for even temperature elevation and distribution of heat within the thermal mass of the septage allowing for consistent pathogen destruction. An alkaline compound is utilized to form a filter cake from the solids fraction of the pasteurized septage preventing vector attraction, while producing a beneficial biosolid. The liquid fraction of the septage is treated by biological process allowing for its discharge into the environment.

U.S. Pat. No. 7,070,693 to Kelly discloses a process and apparatus for the treatment of septage. The process converts the septage into biosolids (sludge) and water dischargeable into the environment. The treated septage achieves pathogen reduction and reduced vector attraction. Treatment of septage by pasteurization causes the destruction of harmful pathogens. Pasteurization of septage having high water content provides for even temperature elevation and distribution of heat within the thermal mass of the septage allowing for consistent pathogen destruction. An alkaline compound is utilized to form a filter cake from the solids fraction of the pasteurized septage preventing vector attraction, while producing a beneficial biosolid. The liquid fraction of the septage is treated by biological process allowing for its discharge into the environment.

U.S. Pat. No. 7,169,306 to Porteous et al. discloses an aerobic digester system in a wastewater treatment plant that is made more versatile for different conditions by addition of an equalizer basin or in some embodiments, a bypass pipe. If in-feed is received from a sequential batch reactor or from a concentrated septage, for example, the equalizer basin can contain one batch, and then deliver the batch out incrementally to a gravity thickener basin. The equalizer basin also enables the gravity thickener of the system to be removed from service when needed, providing increased flexibility for the system. Importantly, the equalizer or bypass enables versatile modes of operation so that a plant designed for a larger, later flow can operate at an initially low flow or at several levels of flow before reaching the largest design flow.

United States Patent Application No. 20060086662 by Ogden discloses waste treatment systems and methods of using them to treat septage, domestic sludge or both are disclosed. Certain examples provided herein relate to waste treatment systems that include a plurality of stages, such as, for example, a plurality of ecosystems, configured to treat domestic sludge, septage or both.

United States Patent Application No. 20060222463 by Subbarayan, et al. discloses landfills and their methods of operation. Through the controlled introduction of septage into solid municipal waste, refuse decomposes faster to achieve additional landfill space. A business method of operating the landfill is also disclosed.

The present invention allows for the construction of remote multiple privately owned site-specific sanitary septage treatment plants (SSTP). The SSTP plants typically will only receive sanitary septage waste generated from locations outside of the established WWTP community. The SSTP with an augmented primary treatment will reduce the high strength raw septage waste concentration to SSTP secondary concentrations close to that of a WWTP secondary. These SSTP plants typically and preferably are located in the local market or service area to minimize tanker drive time. The nutrients can be recovered and then recycled into the earth's biomass.

This high concentration sanitary septage waste is approximately 10 times the normal strength of raw waste entering the WWTP. The WWTP process is stressed by the anaerobic high concentration waste. Waste from uncontrolled sources that is generated outside of the WWTP community can shorten the life of the WWTP plant due to reduced capacity. In addition, management of a public WWTP and private septic hauling business at times are incompatible due to different operational parameters and goals.

Accordingly, there remains a need for systems and methods for the effective and efficient treatment of septage taking into account the distribution of septage sources, delivery volume and schedules, and the required treatment and the associated retention times and throughput requirements of each treatment stage, and that of the system as a whole.

SUMMARY OF THE INVENTION

The present invention includes an augmented treatment system, a septage treatment system, and related methods of septage treatment.

In general terms, the augmented septage treatment and odor control system comprises: (a) an augmented primary treatment process system comprising: (1) a receiving station adapted to receive septage from a vehicle and to pump the septage; (2) at least two mixing and odor control tanks adapted to receive septage from the receiving station, and to generate waste activated sludge; and (3) a primary settling tank adapted to receive effluent from the mixing and odor control tanks, and to generate waste activated sludge. The mixing and odor control tanks typically and preferably comprise a conduit adapted to supply fresh air.

It is preferred that this system additionally comprises: (a) at least one equalization tank adapted to receive septage from the receiving station; and (b) at least one screen adapted to receive septage from the at least one equalization tank; wherein the at least two mixing and odor control tanks are adapted to receive screened septage from the at least one equalization tank, and to generate waste activated sludge. It is also preferred that this system specifically comprise: (a) a first equalization tank adapted to receive septage from the receiving station; (b) a first screen adapted to receive septage from the first equalization tank; (c) a second equalization tank adapted to receive septage from the first screen; (d) a second screen adapted to receive septage from the second equalization tank; wherein the at least two mixing and odor control tanks are adapted to receive screened septage from the second equalization tank, and to generate waste activated sludge.

Also preferred is that the mixing and odor control tanks each comprise a mixing and settling portion. It is most preferred that the mixing and odor control tanks comprise a first and second mixing and odor control tank wherein the first mixing and odor control tank is adapted to have a residence time less than the second mixing and odor control tank (which is typically 2 or more times that of the first tank); and most preferably that the first mixing and odor control tank is adapted to have a residence time less than the second mixing and odor control tank, and wherein the primary settling tank has a residence time greater than the second mixing and odor control tank (which is typically 2 or more times that of the second tank). Typically and preferably the ratio of the residence time of the first mixing and odor control tank to the residence time of the second mixing and odor control tank to the residence time is in the range of from about 1:2:4.

The present invention generally includes a septage treatment, odor control and screening system comprising: (a) an augmented primary treatment process system comprising: (1) a receiving station adapted to receive septage from a vehicle and to pump the septage; (2) a first equalization tank adapted to receive septage from the receiving station; (3) a first screen adapted to receive septage from the first equalization tank; (4) a second equalization tank adapted to receive septage from the first screen; (5) a second screen adapted to receive septage from the second equalization tank; (6) at least two mixing and odor control tanks adapted to receive septage from the second equalization, and to generate waste activated sludge; and (7) a primary settling tank adapted to receive effluent from the mixing and odor control tanks, and to generate waste activated sludge. The present invention thus allows for the incremental dilution and treatment of the septage in preparation for further processing.

The present invention also includes a septage treatment system comprising: (a) a primary treatment process system comprising: (1) a receiving station adapted to receive septage, preferably continually over a 24 hour period, from a vehicle and to further conduct the septage, such as by pumping, to: (2) at least one equalization tank adapted to receive septage from the receiving station; and (3) at least two mixing and odor control tanks adapted to receive septage from the equalization tanks and to add oxygen, and to generate waste primary settled sludge; (b) a primary settling tank adapted to receive effluent from the mixing and odor control tanks, and to generate waste activated sludge; (c) a secondary treatment process system adapted to receive comprising: (1) at least one aeration tank adapted to receive waste activated sludge from the primary treatment process system and to separate more sludge from the water effluent; and (d) a tertiary treatment process system (which may be optional but is preferred) comprising at least one water treatment device adapted to receive water effluent from the aeration tank and selected from the group consisting of: (a) wetland ditches; (b) wetland ponds and (c) aquaculture hydroponics unit and sand bed greenhouses.

Preferably, the tertiary treatment process system comprises: (1) at least one wetland ditch adapted to receive water effluent from the aeration tank and to generate filtered water effluent; (2) at least one wetland pond adapted to receive filtered water effluent from the at least one wetland ditch and to generate filtered water effluent; and (3) an aquaculture hydroponics and sand bed greenhouse adapted to receive filtered water effluent from the at least one wetland pond, to generate filtered water effluent.

The septage treatment system additionally may comprise a secondary settling treatment tank and wherein the primary settling tank is adapted to separate waste activated sludge from the effluent received from the mixing and odor control tanks, and to provide supernatant to the secondary settling treatment tank.

The system also may include a lift station that accepts filtered water effluent from the wetland pond and supplies the filtered water effluent to the aquaculture hydroponics and sand bed greenhouse.

The system may also feature an optional storage pond and a holding tank and pump station that accepts filtered water effluent from the aquaculture hydroponics and sand bed greenhouse and a conduit to conduct the filtered water effluent from the holding tank and pump station to the storage pond, and wherein the storage pond is connected to the wetland pond by a fluid conduit.

The system further may include an optional spray field and a water filtration system that accepts filtered water effluent from the holding tank and pump station and a conduit to conduct the filtered water effluent from the water filtration system to the spray field.

The septage treatment system of the present invention may incorporate a series of sludge drying beds and a series of digester tanks adapted to receive the waste activated sludge from the at least two mixing and odor control tanks and from the at least one primary settling tank, and to generate digested sludge and decant water therefrom, and a conduit to conduct the digested sludge to the series of sludge drying beds. The series of sludge drying beds typically generate dried solids and these solid may be further treated using a compost mound, with a transporter to transport the dried solids to the compost mound.

As an alternative, the system may include a mobile sludge press and a series of digester tanks adapted to receive the waste activated sludge generated by the at least two mixing and odor control tanks and from the at least one equalization tank, and to generate digested sludge and decant water therefrom, and a conduit to conduct the digested sludge to the mobile sludge press.

The present invention also includes an augmented primary treatment process attached to a WWTP. This system comprises: (a) an augmented primary treatment process system comprising: (1) a receiving station adapted to receive septage from a vehicle and to pump the septage; (2) at least one equalization tank adapted to receive septage from the receiving station; (3) at least two mixing and odor control tanks adapted to receive septage from the at least one equalization tank, and to generate waste activated sludge effluent; (4) a primary settling tank adapted to receive the waste activated sludge effluent from the mixing and odor control tanks, and to generate waste activated sludge; (5) a waste water treatment plant; and (6) a conduit adapted to conduct the waste activated sludge from the primary settling tank to the waste water treatment plant.

The invention also includes a septage treatment, odor control and screening system comprising: (a) an augmented primary treatment process system comprising: (1) a receiving station adapted to receive septage from a vehicle and to pump the septage; (2) a first equalization tank adapted to receive septage from the receiving station; (3) a first, preferably coarser screen adapted to receive septage from the first equalization tank; (4) a second equalization tank adapted to receive septage from the first screen; 5) a second, preferably finer screen adapted to receive septage from the second equalization tank; (6) at least two mixing and odor control tanks adapted to receive septage from the second equalization, and to generate waste activated sludge; (7) a primary settling tank adapted to receive effluent from the mixing and odor control tanks, and to generate waste activated sludge; and (8) a waste water treatment plant adapted to receive waste activated sludge from the settling tank.

Preferably, there is a first and a second equalization tank disposed in a fluid communication path, with a coarse screen disposed between the first and second equalization tank, and a fine screen disposed downstream of the second equalization tank.

For enhanced odor control, the system may feature one or more odor control mounds and a conduit to conduct air from the at least one equalization tank through the odor control mound(s).

The present invention includes all of the methods and processes carried out by the various system(s) of the present invention. Included in these methods is a method for processing septage, the method comprising: (1) obtaining septage from a plurality of separate sources; and (2) delivering the septage to a septage treatment system comprising: (a) an augmented primary treatment process system comprising: (1) a receiving station adapted to receive septage from a vehicle and to pump the septage; (2) at least one equalization tank adapted to receive septage from the receiving station; (3) at least two mixing and odor control tanks adapted to receive septage from the at least one equalization tank, and to generate waste activated sludge; and (4) a primary settling tank adapted to receive effluent from the mixing and odor control tanks, and to generate waste activated sludge; (b) a secondary treatment process system adapted to receive waste activated sludge comprising: (1) at least one aeration tank adapted to receive waste activated sludge from the primary treatment process system and to generate water effluent; and (c) a tertiary treatment process system adapted to receive comprising: (1) at least one wetland ditch adapted to receive water effluent from the aeration tank and to generate filtered water effluent; (2) at least one wetland pond adapted to receive filtered water effluent from the at least one wetland ditch and to generate filtered water effluent; and (3) an aquaculture hydroponics and sand bed greenhouse adapted to receive filtered water effluent from the at least one wetland pond and to generate filtered water effluent; and (c) conducting the septage through a septage treatment system so as to obtain treated sewage components and water.

The present invention provides an improvement to prior systems in that it may include remote multiple privately owned site-specific sanitary septage treatment plants. (SSTP). The SSTP typically will only receive septage sanitary waste generated from locations outside of the WWTP community, although alternative sources may supply the septage. The SSTP has a primary stage that is augmented by additional treatments over a WWTP to enable treatment of high strength waste. The SSTP also has an augmented tertiary treatment to enable zero discharge. Discharge water may be further cleaned by multistage tertiary treatment including wetland ditches, wetland ponds and greenhouse covered aquaculture/hydroponics/sand beds and drinking water treatment. Clean water similar to drinking water in quality may be disposed of in a spray field or drain tiles depending on the weather. Water storage is available for extreme cold weather conditions. As an alternative, the Augmented Primary Treatment may be configured to provide effluent to an existing POTW (Publicly Owned Treatment Plant) Sewer Collection line, or a functional equivalent treatment facility, as an alternative Pre-Treatment Process.

The system and methods of the present invention provide effective and efficient treatment of septage, and preferably take into account the distribution of septage sources, delivery volume and schedules, and the required treatment and the associated retention times and throughput requirements of each treatment stage, and that of the system as a whole. This may be done for instance by accounting for and controlling the required volume(s) and retention times for each stage of the treatment such that the flow of septage and its treatment by-products are maintained in the system for complete processing, while being able to accommodate incoming septage over normal delivery cycles, and the release and treatment of septage treatment intermediary and final products, such as waste activated sludge, water, compost, plant material, etc.

These plants may be located in the local market or service area to minimize tanker drive time. The nutrients can be recovered and then recycled into the earth's biomass.

More specifically, the invention involves a process for removing pathogens from the septage and for controlling vector attraction while producing bio-solids that can be utilized as a fertilizer or other beneficial use such as soil conditioner. Additionally, the process allows for the removal of the majority of the water component of the septage and provides for its treatment and subsequent discharge into the environment.

As used herein, septage includes liquids, solids, and semi-solid contents of privies, chemical toilets, cesspools, septic tanks, holding tanks, dry pits, grease traps, grit traps, boat pump out stations, or other sewage waste receptacles, and the like, especially septage that may be collected from a number of septage tanks at individual residences, multi-family dwellings and/or businesses. In addition, septage may include waste generated from "small" wastewater treatment plants (i.e. package plants <100,000 gpd in size) where public sewers are not available.

Some of the principal features of the present invention include the use of augmented and separate primary treatment stages with multiple (e.g., dual) odor reduction purpose; the ability of the system to operate in a zero discharge, stand alone mode and to operate continually over 24 hours; and the ability to dispose of septage through the use of multiple similar plants.

The primary settling process is also improved by conducting what is typically a singular (i.e., 4-hour) settling process in multiple (e.g., three) steps (e.g., at 1, 2, and 4 hours increments), in order to allow the system to operate continuously.

It will be appreciated that each of the elements, features and characteristics of the present invention described herein may be combined independently with one another to achieve the benefits of each such element, feature or characteristic, and their combination.

DETAILED DESCRIPTION OF THE PREFERRED EMBODIMENT

Figure 1:
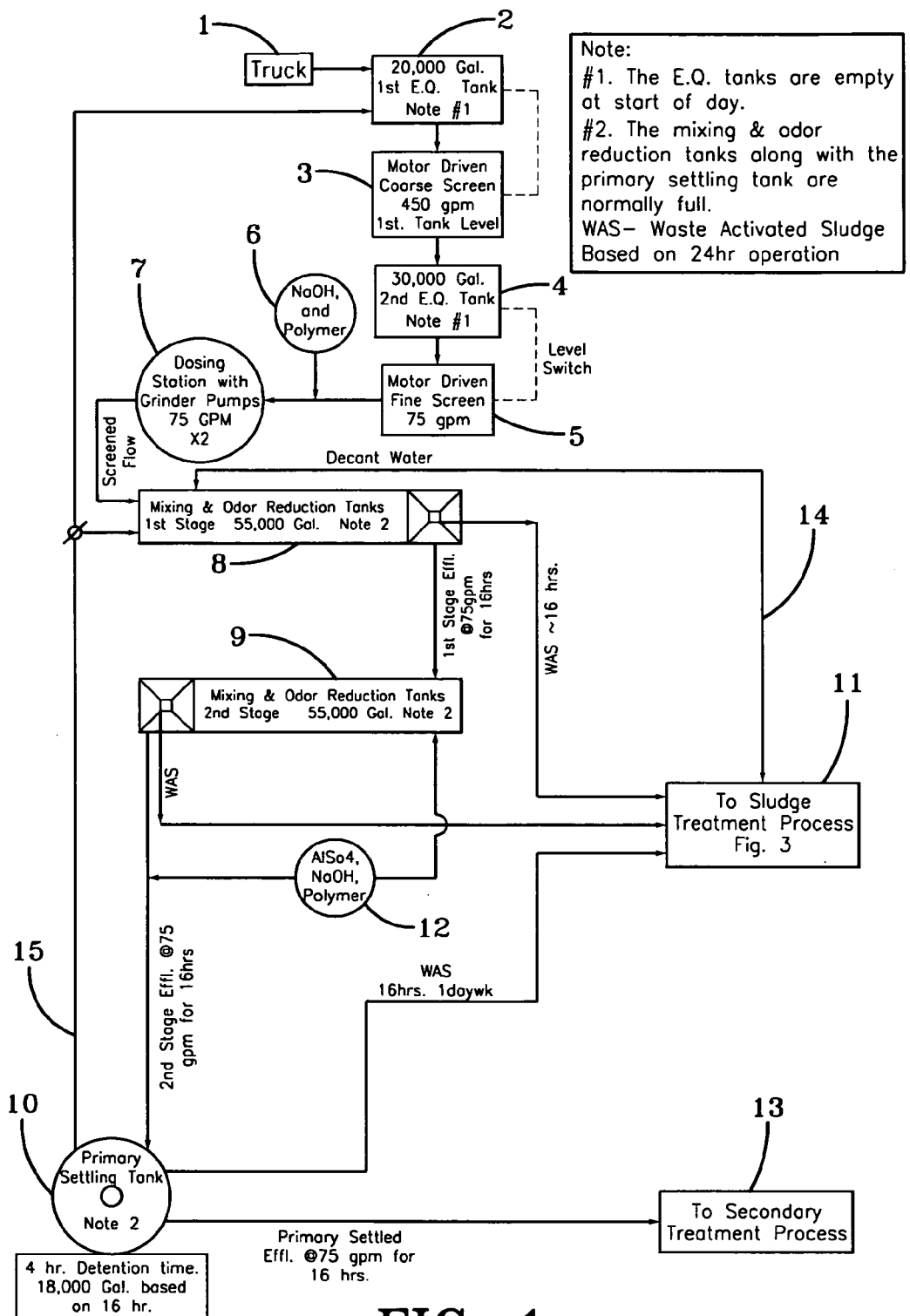
FIG. 1 is a schematic of the primary treatment process in accordance with one embodiment of the present invention.

In accordance with the foregoing summary, the following provides a detailed description of the preferred embodiment, which is presently considered to be the best mode thereof.

The preferred system herein described is not intended to be exhaustive or to limit the invention to the precise forms disclosed. They are chosen and described to explain the principles of the invention and the application of the method to practical uses so that others skilled in the art may practice the invention. For instance, it will be readily apparent to one of ordinary skill that variations in the disclosed parameters and arrangements may be made to suit individual sites and for purposes of scaling the system for a given application. In addition, the process parameters may be varied depending upon the nature of the waste and the desired time and volume treatment desired in order to adapt the system and methods to a given application, without undue experimentation.

The following describes a remote multiple privately owned site-specific sanitary septage treatment plant (SSTP), preferably adapted to receive only septage sanitary waste generated from locations outside of the WWTP community. Typically, the SSTP will only receive septage sanitary waste generated from locations outside of the WWTP community, and/or from sources of sewage, collection, treatment and disposal where public sewers are not otherwise available, although alternate modes of operation in terms of sources of septage sanitary waste are possible.

These plants are located in the local market or service area to minimize tanker drive time. An optional feature of the system of the present invention is to use satellite dumping stations that may be located outside of the service area. These may be used during peak demand periods, as extreme cold weather backup dumping locations or as transfer points. These satellite dumping stations may be in the form of above- or below-ground tanks that may include pumps to fill and empty them. These satellite stations allow the use of smaller fuel-efficient tank trucks locally while larger capacity trucks would periodically drain the tanks for transport to the SSTP.

The method and system of the present invention is described by reference to schematics showing the constituent components in fluid communication. As used herein, the term "fluid communication" refers to the condition where a path or route exists by which a fluid might flow, e.g., a path exists for a fluid, such as a gas or liquid, for example, to flow from a first device or structure to a second device or structure or vice versa.

The SSTP has a primary stage that is augmented by additional treatments over a WWTP to enable treatment of high strength waste. The SSTP also has an augmented tertiary treatment to enable zero discharge operation. Discharge water is cleaned by multistage tertiary treatment in series including wetland ditches, wetland ponds and greenhouse covered aquaculture/hydroponics/sand beds and drinking water treatment for complete nutrient removal. Greenhouses that may be used in accordance with the present invention may be obtained commercially, such as from Texas Greenhouse Co. of Fort Worth, Tex., Painesville Greenhouse Co. of Painesville, Ohio, and RIMOL Greenhouse Systems, Inc. of Hooksett, N.H.

Clean water preferably is disposed of in a spray field or drain tiles depending on the weather, a spray field during normal weather or drain tiles for normal winter weather. Water storage is primarily provided by storage ponds; and optionally also in flooded wetland ponds and in flooded wetland ditches, as well as in empty digesters, when available. Water storage may be used during periods of extreme cold weather conditions such as during cold winter weather where the temperature remains at or below freezing for days or weeks. Also, the trucked in septage waste in extreme weather may be only 25% or less of plant design flow.

The combination of features of the system of the present invention best accommodates the delivery, discharge and treatment of septage over a cycle that best suits periodic delivery of septage from outside the facility, while also providing a system that may be operated efficiently year round even in climates that involve cold and/or freezing temperatures. The system may also be made capable of operating in a zero discharge mode.

The system of the present invention is described in the associated schematics and plant layout showing the several constituent components with conduits for fluid communication indicated by lines, whether for liquids, solids or gases, or combination thereof.

FIG. 1 is a schematic of the primary treatment process in accordance with one embodiment of the present invention. This flow diagram shows the truck receiving and sludge treatment process for the primary part of the SSTP.

FIG. 1 shows the input of the septage such as may be discharged from a tanker truck 1 loaded from a number of septic tanks in a community.

In the preferred embodiment, the sludge truck driver-operated receiving station offers safety, security, and low operating cost advantages. A plant operator is not required to be in constant attendance. The system of the present invention may also feature the pre-approval of the sludge hauler as well as provide the receiving station with security cameras and the required sludge hauler manifest (containing chain of custody) reduces the probability of receiving sludge. Proper sludge handling equipment and wash stations in the receiving station ensure safety and proper hygiene.

In many cases, the sludge truck drivers must normally dump their loads at a WWTP during limited hours and/or be subject to limited discharge volume set by the WWTP to avoid stressing the WWTP activated sludge bacteria.

The receiving station security system may be provided with a security system that allows after hours dumping by truck drivers with the proper security code. Such a security system may monitor volume and account for deliveries.

The longer receiving time and the plant strategic location made possible by the present invention decreases truck driving time, and thus increases the number of loads per day that the sludge truck drivers can deliver.

The plant is designed to process rated capacity in 16 hours operation to reserve 8 hours for the receiving station equalization tank emptying and required preventative maintenance. However, the SSTP can receive sludge hauler loads 24 hours a day. As will be apparent from the present disclosure, the volume, treatment capacity and resident times of the individual system components may be adjusted to process at greater or lesser rates depending upon the requirements of each site and/or the local market or service area.

Septage Tank Haulers Receiving Station

The receiving station building preferably will have three inside dump stations, two equalization tanks, two conveyor fed solids separators, a pH station and a polymer station.

The sludge hauler trucks normally will deliver at least 4,000 gallons with each load. At a plant capacity of 70,000 gallons per day, about 18 full truckloads can be received daily at the treatment plant. Three trucks can dump their loads at the same time with an estimated dump time of 12 minutes for a 4,000 gallon truck. Each truck will pull into a bay door that may be designed to open automatically. The tanker preferably will pull onto a ramped dump station, to ensure all waste is emptied. An onsite hose, stored in a channel on the floor, is used to connect to the truck. The raw sludge will be discharged into a channel in the floor. This channel is sloped towards the first primary treatment 20,000 gallon covered equalization tank 2. Large grit and rocks will drop to the bottom of this trough.

The first 20,000 gallon covered equalization tank 2 receives the raw sludge from the trucks. (While the maximizer conveyor fed separator is described here, it is understood that a different type of screen could be substituted without changing the process.) The septage is screened and the separated grit washed using a motor-driven coarse screen maximizer 3, preferably at about 450 gallon/minute (first tank level).

The maximizer is an inclined screen solids separator that can be used to separate non-soluble large objects (screenings), typically greater than 1" size, from slurry waste at a flow rate typically up to about 450 gpm with a coarse screen, and typically up to about 150 gpm with a fine screen that separates out particles greater than ⅜". The lower end of the first maximizer rests in the input end of the first equalization tank 2. The screenings are then transported up the inclined screen using a wiping/carrying system consisting of a series of rubber paddles attached to chains driven by an electric motor. As the waste screenings are transported up the inclined screen, septage waste flows through the bar screen to the downstream portion of the first equalization tank. The grit settles to the bottom of the downstream portion of the first equalization tank. High density grit will settle out in less than 1 minute in this first tank. An auger carries the grit from the first equalization tank to the grit/screenings bin. At the top of the first maximizer conveyor the screenings drop into the grit/screenings bin.

This coarse screen maximizer is controlled by level switches in the first equalization tank. When the equalization tank water level gets high enough the level switches will turn on the screen conveyor and screening wash water. The raw sludge with large debris removed then flows at a rate typically up to 450 gpm rate to the second 30,000 gallon covered equalization tank 4. With the coarse screen maximizer off, leakage through the stationary screen will tend to equalize the levels of the two equalization tanks.

The following treatment is described based upon 24 hour operation, although other time frames may be used as desired.

The septage is then sent into a second E.Q. tank 4, such as a 30,000 gallon E.Q. tank. The septage is then processed using a motor-driven fine screen 5, preferably and typically at about 75 gallon/minute set by a downstream pump that is controlled by a level switch.

The partially screened septage waste then flows into the second 30,000 gallon covered equalization tank. The lower end of the second maximizer preferably rests near the output end of the second covered equalization tank. The sludge will then go through the second conveyor fed screen and washer with a fine screen. This maximizer screen is controlled by a second level switch in the second equalization tank. When the screened sludge in the second equalization tank gets high enough, the level switch will turn on the second maximizer. The second maximizer screenings are dropped to a second screening storage bin.

The screenings from both maximizers are estimated to be collected at about a total rate of 1 cubic yard per day @70,000 gpd. Wash water shall rinse the screenings prior to entering either storage bin. This second equalization tank level switch also controls the two chemical dosing pumps and the grinder pumps.

Further processing is carried out by the addition of sodium hydroxide and polymer addition before being conducted further to dosing station 7 with 2 grinder pumps operating preferably at about 75 gallon/minute. The sodium hydroxide (NaOH) holding tank/pump and a settling enhancement polymer feed station 6 located in the Receiving Station will deliver both pH adjusting chemical and the polymer to mix with the screened sludge after the second screening process. The screened sludge from the second maximizer 5 flows to a dosing station 7.

The dosing station 7 also contains a grinder pump, and has an effective volume of about 4500 gallons. The grinder pump will pump 75 gpm sludge to the first stage mixing and odor reduction tank 8 located outside of the Receiving Station.

Typically, the E.Q. tanks are empty at the beginning of an operating day cycle of about 16 hours.

Multistage Activated Sludge Treatment

The screened flow is then brought to the first stage mixing and odor tanks 8 which in this embodiment hold 55,000 gallons. The first stage effluent is pumped at 75 gallon/minute for about 16 hours to the second stage mixing and odor tanks 9 which in this embodiment hold 55,000 gallons as well.

The first stage mixing and odor reduction 55,000 gallon tank 8 or the first equalization tank 2 receives the sludge and mixes it with a 37 gpm recycled supernate from the primary settling tank 10 and digesters tank, which is used for flushing and to reduce its solids percentage from 2% to about 1.5%. Tanks that may be used as primary settling tanks may be obtained commercially, such as from manufacturers such as Mack Industries of Valley City, Ohio, Precast of Nevada, Ohio, or Norweco of Norwalk, Ohio.

The diluted sludge is easier to agitate and pump. The functions of the first mixing and odor reduction tank 8 are to properly mix the added chemicals, to begin odor reduction and to settle out larger suspended solids. It will be understood that the digesters tank may be operated either anaerobically or aerobically.

The mixture is then aerated and rolled along the length of the tank to achieve a reduction of septic quality. A settling chamber at the end of the tank has a 1 hour detention time. Since the "heavy" floc is expected to settle in about 1 hour, this first stage is expected to greatly reduce total suspended solids (TSS). The first stage settled floc is sent to the sludge treatment process 11. The partially clarified water is sent to the second stage mixing and odor reduction tank 9.

The second stage mixing and odor reduction 55,000 gallon tank 9 receives the sludge and mixes it with treatment chemicals from a dosing station. The chemicals normally include sodium hydroxide, to increase pH for optimum bacteria growth; polymer, to enhance suspended solids settling and aluminum sulfate for phosphorus removal. The mixture is then aerated and rolled along the length of the tank to enhance aerobic quality. Equivalent or alternative chemical treatments may be used.

A settling chamber at the end of the tank has a 2 hour detention time. This second stage is expected to greatly reduce total suspended solids (TSS) to approach the level common to residential waste water in WWTP. The second stage settled sludge is sent to the sludge treatment process 11. The mostly clarified water is sent to the primary settling tank 10 that, in this embodiment, has a four hour detention time.

During the night (nominally 8 hours) the 37 gpm return flow from the primary settling tank 10 supernate continues to flow into the first stage tank input. The night return flow clarifies the upstream portion of the first mixing and odor reduction tank 8. Optionally, the primary settling tank 10 supernatant may be directed upstream to the E.Q. tanks for dilution purposes. This may be carried out using an appropriate valve in the supernatant line.

Preferably, the blower-supplied coarse bubble diffusers maintain an agitation flow in both mixing and odor reduction tanks so that settable solids at night only settle in both of the two clarifiers.

The 26,000 gallon covered primary settling tank 10 is designed for the standard WWTP four hour detention time (based on 112 gpm flow for 16 hours/day), although other volume/processing time parameters may be used. Just prior to entering the tank, the mostly clarified water is dosed with chemicals 12 such as from the same location used for second stage mixing and odor reduction tank 9 (using, for instance, sodium hydroxide, polymer and aluminum sulfate). The primary settling tank effluent is then sent to the secondary treatment process 13 at a 75 gpm for 16 hour/day rate. Since the primary settling tank influent concentration and detention time is almost the same as that of a WWTP primary, the primary settled effluent is expected to be very similar to that of a WWTP.

Both mixing and odor tanks 8 and 9 and the primary settling tank 10 are normally full.

The schematic also shows how the waste activated sludge (WAS) produced by both mixing and odor tanks is intermittently wasted to the sludge treatment process 11 about once a day or continuously during the normal eight hours of the delivery day.

The first stage effluent is pumped at 75 gallon/minute for about 16 hours to the primary settling tank 10 which in this embodiment holds about 26,000 gallons based upon 16 hour operation. The primary settling requires about 4 hours detention time, and returns waste activated sludge (WAS) based upon 16 hour cycling at 1 day/week to the sludge treatment process.

The supernatant 14 from the sludge treatment process digesters and the supernatant 15 from the primary settling tank 10 may be returned to the first stage mixing and odor tanks or the first E.Q. tank in a 16 hour cycle for dilution.

Aluminum sulfate, sodium hydroxide and polymer may be added to the supernatant 15 from the primary settling tank 10 and to the second stage mixing and odor tanks 9 as shown.

The primary settled effluent is pumped at 75 gallon/minute for about 16 hours to the secondary treatment process. The supernatant from the sludge treatment process digesters and from the primary settling tank 10 may be returned to the first stage mixing and odor tanks and or the first E.Q. tank in a 16 hour cycle for dilution.

Secondary Treatment Process

Figure 2:
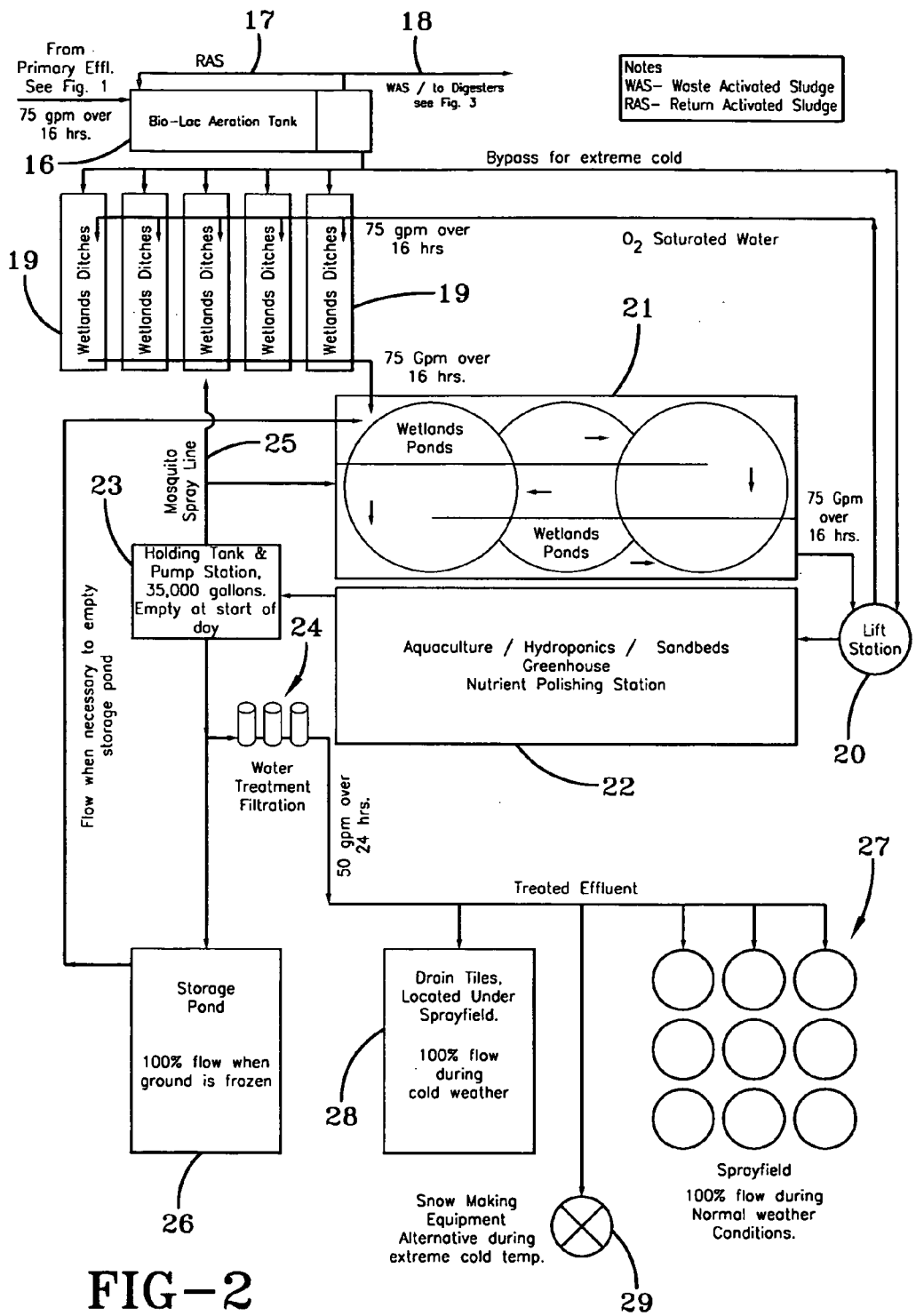
FIG. 2 is a schematic of the secondary and tertiary processes in accordance with one embodiment of the present invention.

Referring to FIG. 2, this Figure shows a schematic of the secondary and tertiary treatment processes. This flow diagram shows the treatment process for the water discharged from the SSTP primary part of the SSTP.

The primary settled effluent is sent to the secondary treatment aeration tank, such as a Biolac® Aeration Tank 16 at a 75 gpm rate @16 hours/day. While the Biolac® system is described here, other types of secondary treatment will give identical performance. The Biolac® has maintenance and operation advantages over other secondary treatment systems. A Biolac® Wastewater Treatment System is installed in the secondary tank. The Biolac® Wastewater Treatment System is commercially available from Parkson Corporation of Fort Lauderdale, Fla.

The Biolac® uses fine-bubble diffusers attached to floating aeration chains, which are moved across the basin by the air released from the diffusers. The moving diffusers provide efficient oxygen dispersion in the basin contents, as well as high oxygen transfer at low energy usage. There is no submerged aeration piping. Each aeration chain can be individually controlled by an air valve. The aeration chains with diffusers do not harm a basin liner or an unlined basin bottom. Inspection and service of the diffusers is done quickly and easily without dewatering the basin, keeping maintenance costs low. The Biolac® system is adapted for winter operation.

The Biolac® System mixes the aeration volumes to achieve a 30-70 day sludge age treatment. Features include 10/15/1 ppm (BOD/TSS/$NH_3$) effluent and an integral secondary clarifier. Sludge is removed from the Biolac™ clarifier bottom. Some of the sludge is re-circulated, as return activated sludge (RAS) 17, to the Biolac® system input to increase sludge age and to "seed" the Biolac® system if necessary. The remainder of the sludge is intermittently wasted, as Waste Activated Sludge (WAS) 18, to the digesters in the sludge treatment process 11.

The Biolac® clarifier effluent, treated to normal WWTP secondary effluent quality, is then sent to the wetlands ditches 19 for tertiary treatment. Wetlands ditches that may be used in accordance with the present invention include those available from commercial designers, such as J.F. New of Grand Haven, Mich.

The primary settled effluent is conducted to a Biolac® aeration tank at a rate of about 75 gallon/minute over about 16 hours. The effluent from the aeration tank is then conducted to a number of wetlands ditches through which a flow rate of about 75 gallon/minute over about 16 hours is maintained. During periods of extreme cold, the wetlands ditches may be by-passed directly to the lift station 20.

The treated effluent from the wetlands ditches is conducted to wetlands ponds 21 for further treatment. From there, the mostly treated water is sent to a lift station 20 which in turn sends the material to a combination aquaculture/hydroponics and sand beds greenhouse 22 nutrients polishing station.

After treatment, the effluent is sent to a holding tank 23 that holds about 35,000 gallons and is normally kept empty based at the beginning of the daily cycling. From this tank, the liquid is further conducted to the water treatment filtration system 24, and a portion of the liquid optionally may be sent through a mosquito spray line 25 for the wetlands ditches 19 and wetlands ponds 21. When required, the liquid from this tank optionally may be conducted to a storage pond 26 which receives 100% of the flow when the ground is frozen, and from which it may be reintroduced to the wetlands ponds 21 for reprocessing, when emptying of the storage pond 26 is permitted.

The water treatment filtration system 24 supplies effluent at a flow rate of about 50 gallon/minute over about 24 hours to a spray field 27 which typically receives 100% of the flow during normal weather conditions, or to drain tiles 28 located under the spray field 27, which receives 100% of the flow during cold weather conditions. During very cold weather, the flow optionally may be directed to snow-making equipment 29 as shown.

Figure 3:
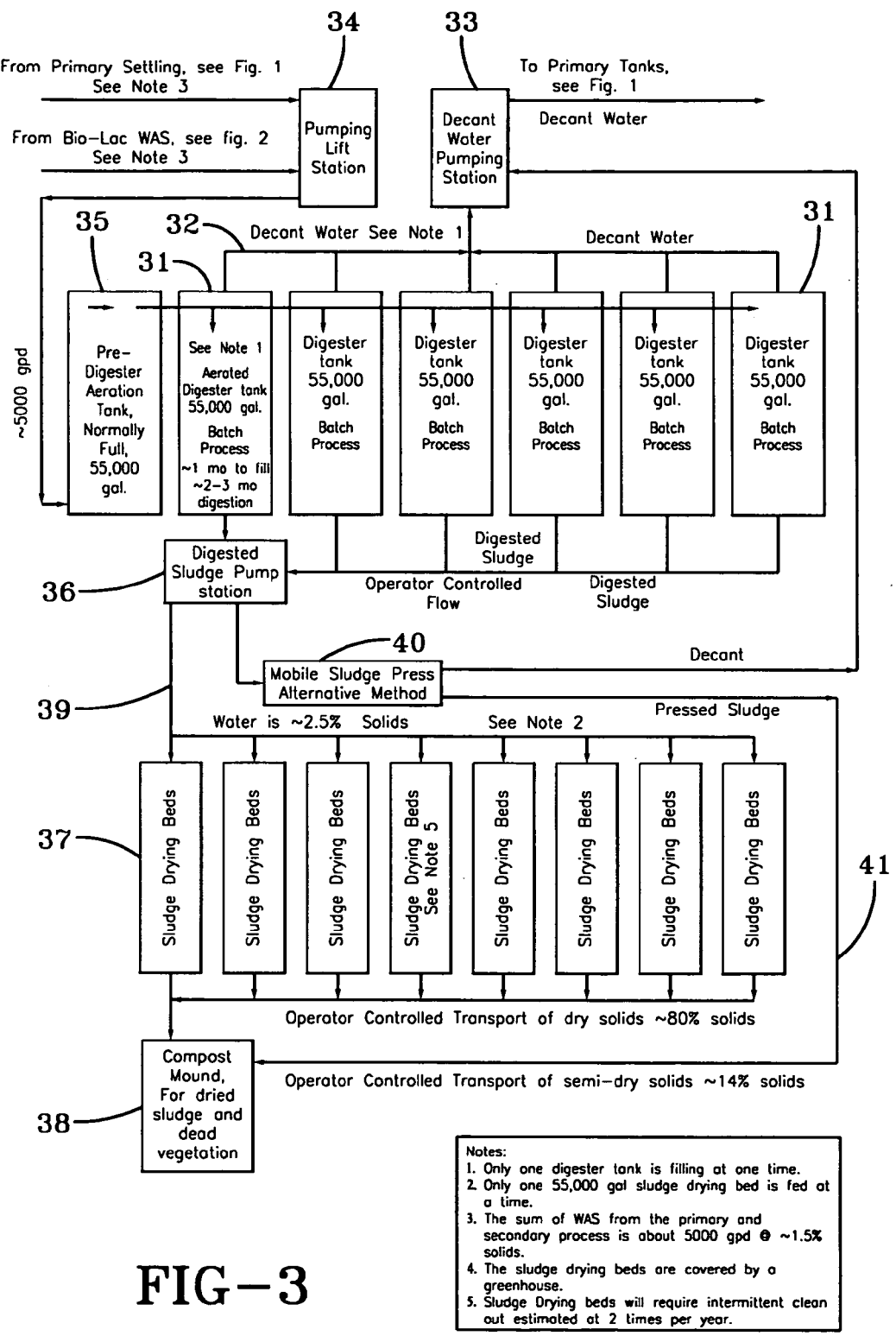
FIG. 3 is a schematic of the sludge treatment process in accordance with one embodiment of the present invention.

FIG. 3 depicts a schematic of the sludge treatment components of the system of the present invention. This flow diagram shows the treatment process for the sludge discharged from the SSTP primary part of the SSTP.

FIG. 3 shows the effluent flow from the primary settling tank 10 and Biolac® waste activated sludge (WAS). The total WAS from the primary and secondary processes is about 5,000 gallon/day, and contains about 1.5% solids.

The WAS from the primary settling tank 10 and Biolac® is sent to the pumping lift station 34 from which it is supplied typically at about 5,000 gallon/day, to a series of aerated digester tanks. Each tank typically holds about 55,000 gallons. Preferably, only one digester tank is filling at one time during the processing cycle, each tank taking about 1 month to fill and requiring about 2-3 months for digestion process. The decant water 32 from the aerated digester tanks 31 is directed to the decant water pumping station 33 from which it may be returned to the primary tanks as shown in FIG. 1.

Tertiary Treatment Process

The five wetland ditches 19, arranged for parallel flow, receive a total of 75 gpm of secondary treated water from the Biolac™ Aeration Tank 16. One function of the wetland ditch(es) is to treat light solids that do not settle out in the Biolac® clarifier after sludge blanket wasting. Each wetland ditch is estimated to have an ~8" maximum depth and a 4" average depth to allow light to reach ditch aquatic life. The estimated total 47,700 gallon volume of the five ditches provides an ~8.5 hour detention time during the normal 16 hours of plant operation. It is estimated that the wetland ditch effluent shall be 5/8/1 ppm (BOD/TSS/$NH_3$) during normal SSTP full capacity operation.

During warm weather a mosquito abatement evening water spray over the entire wetland ditch surface may be necessary. This timer controlled spray from the tertiary holding tank and pump station 23 agitates the water to prevent mosquitoes from laying eggs.

The wetland ditches 19 can also be flooded to a 4' depth to provide 570,000 gallons storage during extreme cold weather.

The wetland ponds 21 receive the wetland ditch effluent at a 75 gpm design flow rate. The wetland ponds consist of three 18" deep (during normal operation) water channels arranged in a serpentine manner in series. The channels are separated by two dikes that hold the mosquito spray equipment and permit operator access. The wetland pond volume during normal operation is 406,000 gallons. The detention time of the wetland ponds normally is 5-6 days.

The wetland ponds can be flooded to a 6' depth to provide 1,622,000 gallons storage during extreme cold weather.

During warm weather mosquito abatement, timer-controlled evening spray over the entire wetland ponds surface is necessary. The greenhouse lift station preferably contains two pumps, fine bubble diffusers and has a 18,000 gallon tank. One pump sends 50 gpm nearly oxygen saturated water to the greenhouse.

The greenhouse contains three treatment processes. First, the 75 gpm flow passes through aquaculture trays. The aquaculture trays contain fast growing aquatic plants such as water hyacinths to remove water residual nutrients. Next the water passes through hydroponics trays containing selected land plants again with the purpose of removing water residual nutrients. Then the water drains to an under-drain system located below ground level under the greenhouse aquaculture and hydroponics trays. The under-drain system contains a rapid sand filter designed similar to drinking water filters that will remove any remaining suspended solids in the water. During normal operation the greenhouse effluent is sent to the holding tank and pump station 23.

The greenhouse 22 can maintain an internal air temperature perhaps 20 degrees F. higher than the outside ambient due to solar heat. This allows the greenhouse 22 processes to operate during spring, summer, fall and mild winter conditions with negligible fossil fuel heating. The greenhouse 22 provides a final polishing (very clean effluent water) to almost drinking water standards during normal operation.

If extreme cold weather operation is not necessary, an alternative SSTP process could eliminate the greenhouse if the wetland ditch and wetland pond treatment capacity was sufficient.

Also if the greenhouse hydroponics grew crops with large commercial significance, the greenhouse could be moved to either between the wetland ditches and the wetland ponds or between the Biolac® Aeration tank and the wetland ditches to make available nutrients to the greenhouse plants.

The below ground holding tank and pump station 23 contains UV lights to kill bacteria, pumps and a 35,000 gallon holding tank. The 35,000 gallon holding tank is normally empty at the start of the working 24 hour day. During the working day 70,000 gallons (50 gpm over 24 hours) enters the holding tank. Since the secondary effluent tank 16 is adapted for 75 gpm over 16 hours, 24,000 gallons will accumulate in the wetland pond. The 50 gpm flow during the last 8-hour night period will empty the tank again.

The holding tank and pump station UV lights and the downstream outside mounted water treatment filtration 24 treat the 50 gpm holding tank and pump station effluent to drinking water standards. During normal operation the 50 gpm effluent is sent to the spray field 27 for disposal and is recycled to the aquifer.

During warm weather a pump in the holding tank and pump station supplies water to the mosquito abatement sprays.

The spray field 27 disposes the 50 gpm clean water by a combination of evaporation, plant transpiration and leaching into the ground. The size of the spray field is dictated by normal soil percolation rate, local rainfall and clean water application rate capacity computations to avoid surface runoff. Since the water to be disposed is clean, no BOD load is imposed on the spray field.

During cold weather, as long as the ground is not frozen, the holding tank and pump station 23 effluent is sent to the underground drain tiles 28 located under the spray field 27. The drain tiles 28 dispose of the clean water by leaching into the ground.

During extremely cold weather, the holding tank and pump station 23 sends its effluent to the at least one, preferably two storage ponds 26 with a combined capacity of 3,800,000 gallons. Birds and wild animals may somewhat contaminate the stored water. When normal weather returns the water in the storage pond(s) is drained to the inlet of the wetlands ponds 21 to receive the normal polishing and disinfectant treatment. During normal operation, the operators shall keep the storage pond(s) empty.

Clean water is disposed of in a spray field during normal weather or drain tiles for normal winter weather.

Sludge Treatment Process

The septic sludge/transfer tank 34 (WAS Pump Lift Station) located at the start of the sludge treatment process receives waste activated sludge (WAS) from both mixing and odor reduction tanks 8 and 9, the primary settling tank 10 and the secondary Biolac® treatment tank 16.

The pumps in the WAS pump lift station 34 are controlled by lift station sludge level sensors. The entire WAS from the four sources is pumped into the first aerated digester (pre-digester aeration tank) 35. This tank is normally full with a volume of 55,000 gallons. With a wasting rate (WAS flow rate from clarifiers) of about 5,000 gallons/day, the detention time through the first tank is 11 days. The percent solids in pre-digester aeration tank 35 is estimated to be about 1.0-1.5% solids. As the WAS is pumped into the pre-digester aeration tank 35, an equivalent amount of flow will flow into an empty online digester tank 31 during a normal day. At a wasting rate of ~5000 gallons/day it will take 11 days to fill one digester tank 31 that has a capacity of 55,000 gallons. The sludge detention time at this point will be about 23 days. It is believed that the odor by this time will be greatly reduced.

Assuming initially empty digesters, the digester operational sequence will typically proceed as follows:

1. After the first digester is full, the valve for the first digester will be closed and the second digester will be put on line.
2. At SSTP design capacity, it will take another 11 days to fill the next digester.
3. With a total of six digesters it is estimated to take about 66 days to completely fill the digesters; with a total of 77 days of aerated detention time.
4. After ~25 days of digestion in each digester, air will be turned off and the solids allowed settling time. The supernatant will be decanted off the top of the digester to allow more room for WAS. The digesters can be repeatedly decanted and filled again to increase the solids content. To allow pumping the final digested sludge can be no greater than 2.5% solids.

The digested sludge will then be drained to the digested sludge pumping station 36 via a floor drain. The sludge is pumped to one of the six sludge drying beds 37. Each bed can hold 55,000 gallons of digested sludge. The dried sludge will dry to approximately 60% solids.

The dried solids will be manually removed and deposited on the compost mound 38. In the event the digesters are full and the sludge drying beds are full a mobile sludge press could be used to remove the digested sludge.

The filtrate will then be pumped back into the decant water pumping station 33. The decant water pumping station 33 pumps the filtrate to the inlet of the primary first mixing and odor reduction tank 8 for treatment.

The digested sludge is conducted through a sludge pumping station to a battery of sludge drying beds 37, each being about 55,000 gallons in this embodiment. Preferably, only one sludge drying bed is fed at a time during the processing cycle. The water effluent 39 directed to the sludge drying bed contains about 2.5% solids. The dried sludge, about 80% solids, may then be transported by appropriate means to a compost mound 38 or similar composting system which may be used to compost dried sludge and vegetation from the agricultural portions of the system.

As an alternative, the digested sludge may be processed through a mobile sludge press 40, from which the decant water is redirected to the decant water pumping station 33. From this process, operator controlled transport of the semi-dry solids (about 14% solids) 41 may further be directed to the compost mound 38 or similar composting system.

Figure 4:
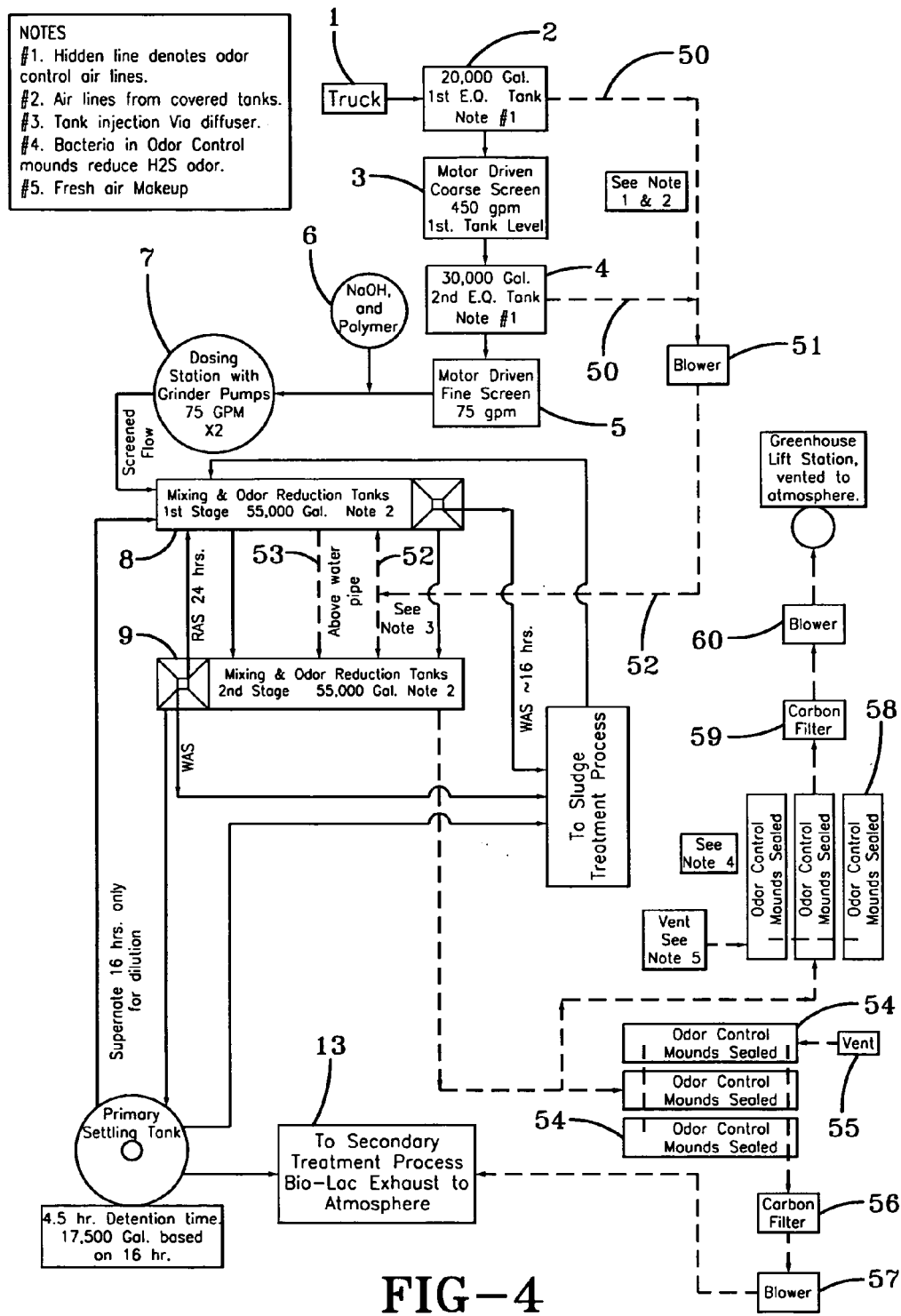
FIG. 4 is a schematic of a primary treatment process including enhanced odor control in accordance with another embodiment of the present invention.

FIG. 4 shows a schematic showing an odor reduction process system incorporated into the primary treatment process shown in FIG. 1, in accordance with one embodiment of the present invention. This flow diagram shows the treatment process to reduce the odor from the SSTP.

FIG. 4 shows additional odor control lines 50 extending from the sealed E.Q. tanks 2 and 4 which are conducted via air lines from the covered tanks, through a blower 51 to pipes 52 serving both mixing and odor tanks 8 and 9 through an injection diffuser. An above water pipe 53 also serves the mixing and odor tanks 8 and 9. Air from the mixing and odor tanks 8 and 9 is further conducted to sealed odor control mounds 54 which may contain bacteria to reduce $H_2S$ odor. Air from the odor control mounds 54 may then be further supplied with fresh air through vents 55, and may then supply treated air either through a carbon filter 56 and blower 57 to the greenhouse lift station 20 where it is vented to the atmosphere, or to the secondary process Biolac®16 to be exhausted to the atmosphere.

Odor Reduction Process

In the SSTP, the raw sludge is septic or non-aerobic and smells bad largely due to hydrogen sulfide emission. As the sludge is aerated and treated the sludge becomes aerobic and the smell is greatly reduced. The SSTP tanks containing septic sludge are sealed by a cover, and the odorous air from the sealed tanks is treated to greatly diminish the odor.

The first and second equilibration tanks 2 and 4 in the receiving station hold septic raw waste and must be covered. Air lines 50 allow the odorous air to pass to the mixing and odor reduction blower 51 suction where it is mixed with atmosphere makeup air. The mixing and odor reduction blower sends pressurized air to the medium to course bubble diffusers located in the two mixing and odor reduction tanks 8 and 9. These tanks are also covered. The bubble diffusers create many small air bubbles near the bottom of the two mixing and odor reduction tanks 8 and 9. The sludge in the first mixing and odor reduction tanks is probably still septic. The sludge in the second mixing and odor reduction tanks is probably somewhat septic at its inlet but aerobic near its outlet.

The large air/water surface area of the many small bubbles allow much odor causing gas to be absorbed either into the tank water or into the bubble depending on relative concentration levels. Thus the air above the liquid level of certainly the first mixing and odor reduction tank 8 and perhaps above the second mixing and odor reduction tank 9 still smells.

The odorous air from above the sludge in the first mixing and odor reduction tank 8 is drawn by suction from the downstream blowers to above the liquid level near the second mixing and odor reduction tank inlet. The air from both mixing and odor reduction tanks is then drawn from near the exit of the second mixing and odor reduction tank by the downstream blowers.

The air is then treated by two identical odor reduction processes in parallel. Each odor control process consists of three parallel sealed odor reduction mounds 58, followed by an activated carbon filter 59 and finally the blower suction.

The sealed odor reduction mounds 58 contain above- or underground wet bacteria holding media. These bacteria consume the odor causing hydrogen sulfide gas.

The very large surface area of the activated carbon filters absorbs most odorous particles or gases left in the air. After leaving the activated carbon filters the cleaned air enters a blower suction 60.

One parallel odor treatment path leads to the Biolac® blower 57. The filtered air is mixed with the atmospheric air to achieve the proper flow for the Biolac® aeration tank 16. The Biolac® secondary treatment is aerobic and thus does not require a cover. The diffused air is then exhausted to atmosphere at the Biolac® Aeration Tank.

The second parallel odor treatment path leads to the greenhouse. The air is then exhausted, preferably to atmosphere at the greenhouse after diffusion through the 35,000 gallon holding tank 23.

Normal Winter Operation: Clean water is disposed of in drain tiles located under the spray field during normal winter weather. Normal winter weather will not freeze the ground around the drain tiles.

Extreme Cold Weather Operation: Extreme cold weather can freeze the ground and prevent drain tile operation. Water storage in the storage pond(s) (3,800,000 gallons total); and then in flooded wetland ditches (570,000 gallons @4' depth), flooded wetland ponds (1,622,000 gallons @6' depth) and flooded digesters (330,000 gallons total) provide a total 6,320,000 gallons available for extreme cold winter weather storage. This provides a 90 day storage capacity based on rated SSTP capacity.

However, the trucked in septage waste in extreme cold weather is likely to be only 25% of the designed plant flow of the described embodiment. This would amount to a 6 month storage capacity.

The Biolac® blower odor treatment process is shut off during extreme cold weather while the greenhouse odor treatment process may be held available, or visa versa. A line from the Biolac® aeration tank 16 to the greenhouse lift station 20 is used in extreme cold weather to bypass the frozen wetland ditches and wetland ponds.

Figure 5:
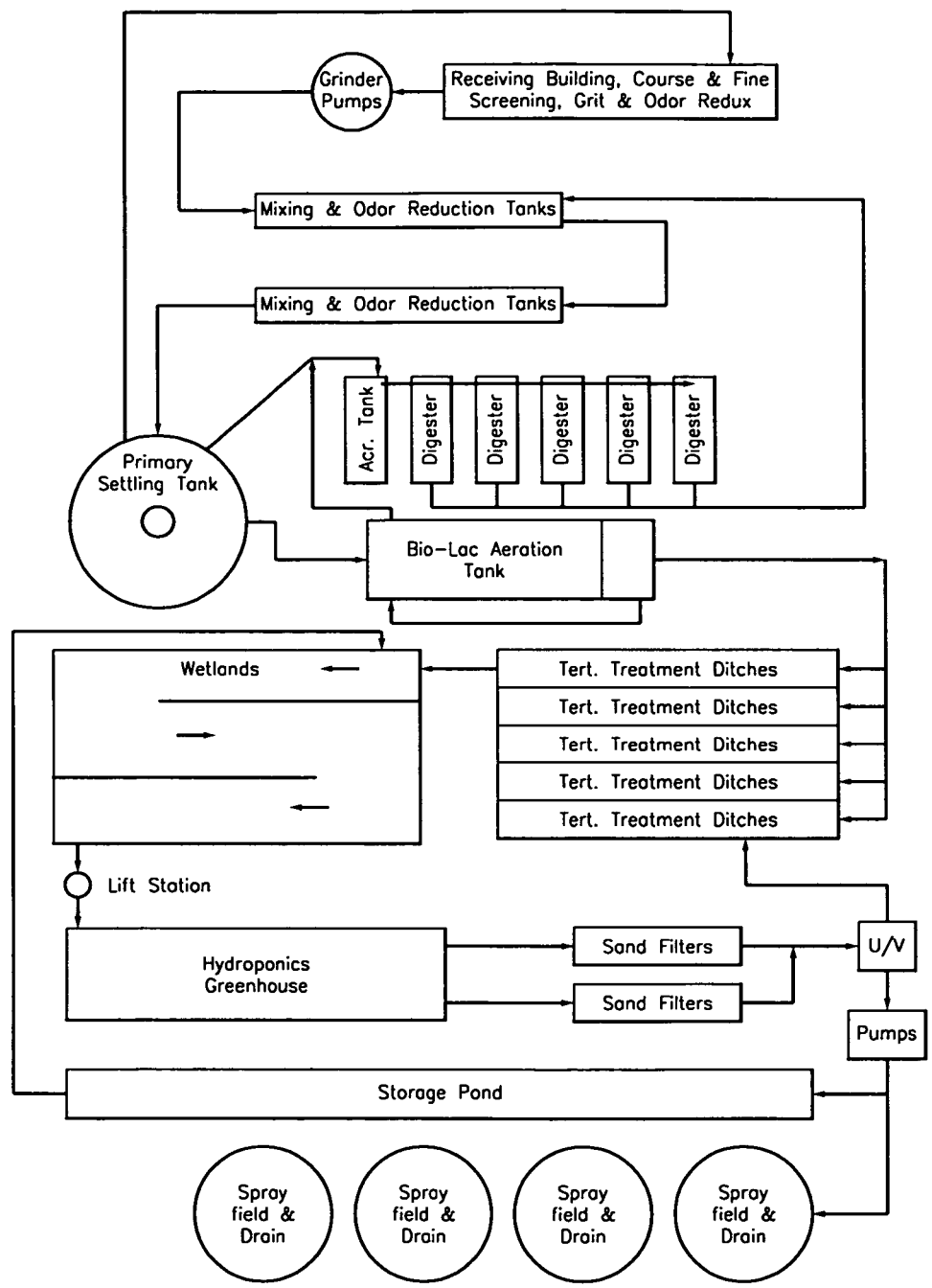
FIG. 5 is a schematic of an example of a plant layout in accordance with one embodiment of the present invention.

FIG. 5 shows a schematic of a preferred plant layout containing the constituent components shown in FIGS. 1-4 with additional odor control elements. This shows a proposed preferred property layout of the SSTP.

Figure 6:
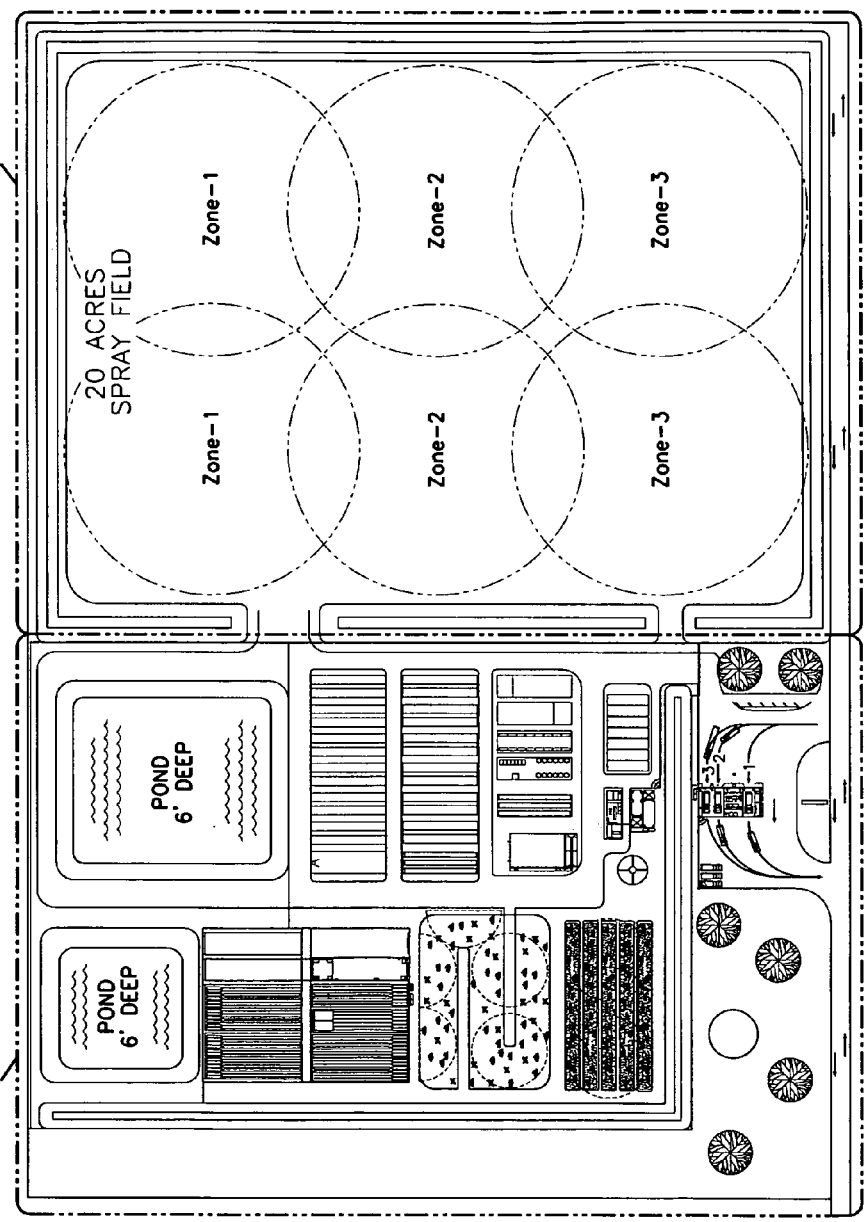
FIG. 6 is a detailed portion of a plant layout in accordance with one embodiment of the present invention.

FIG. 6 shows a plan view of a preferred plant layout containing the constituent components shown schematically in FIGS. 1-5. This shows a proposed preferred property layout of the SSTP.

Figure 7:
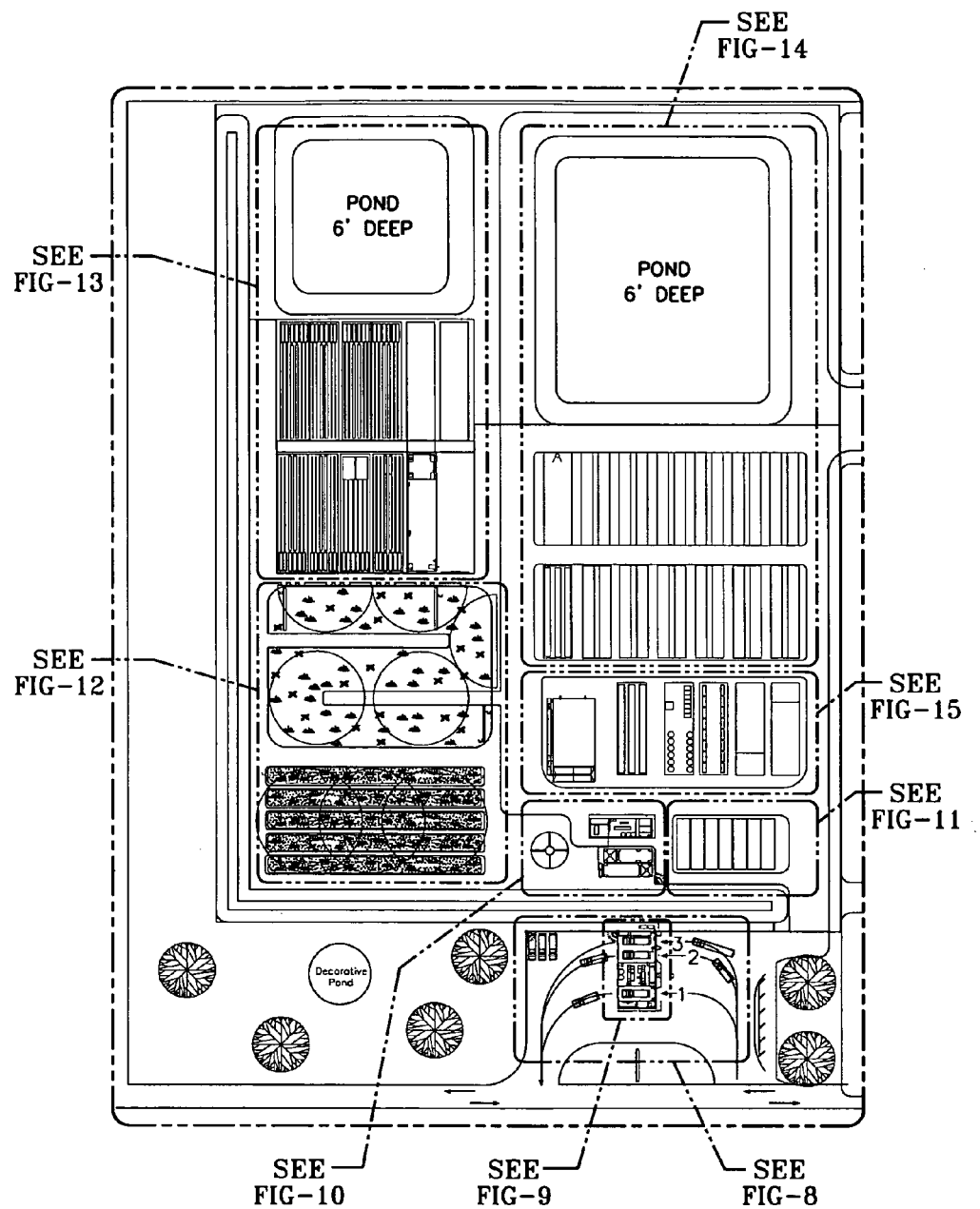
FIG. 7 is a detailed portion of a plant layout in accordance with one embodiment of the present invention.

FIG. 7 shows a detailed plan view of a portion of a preferred plant layout containing most of the constituent components shown in FIG. 6, and making reference to further detailed FIGS. 8-15.

Figure 8:
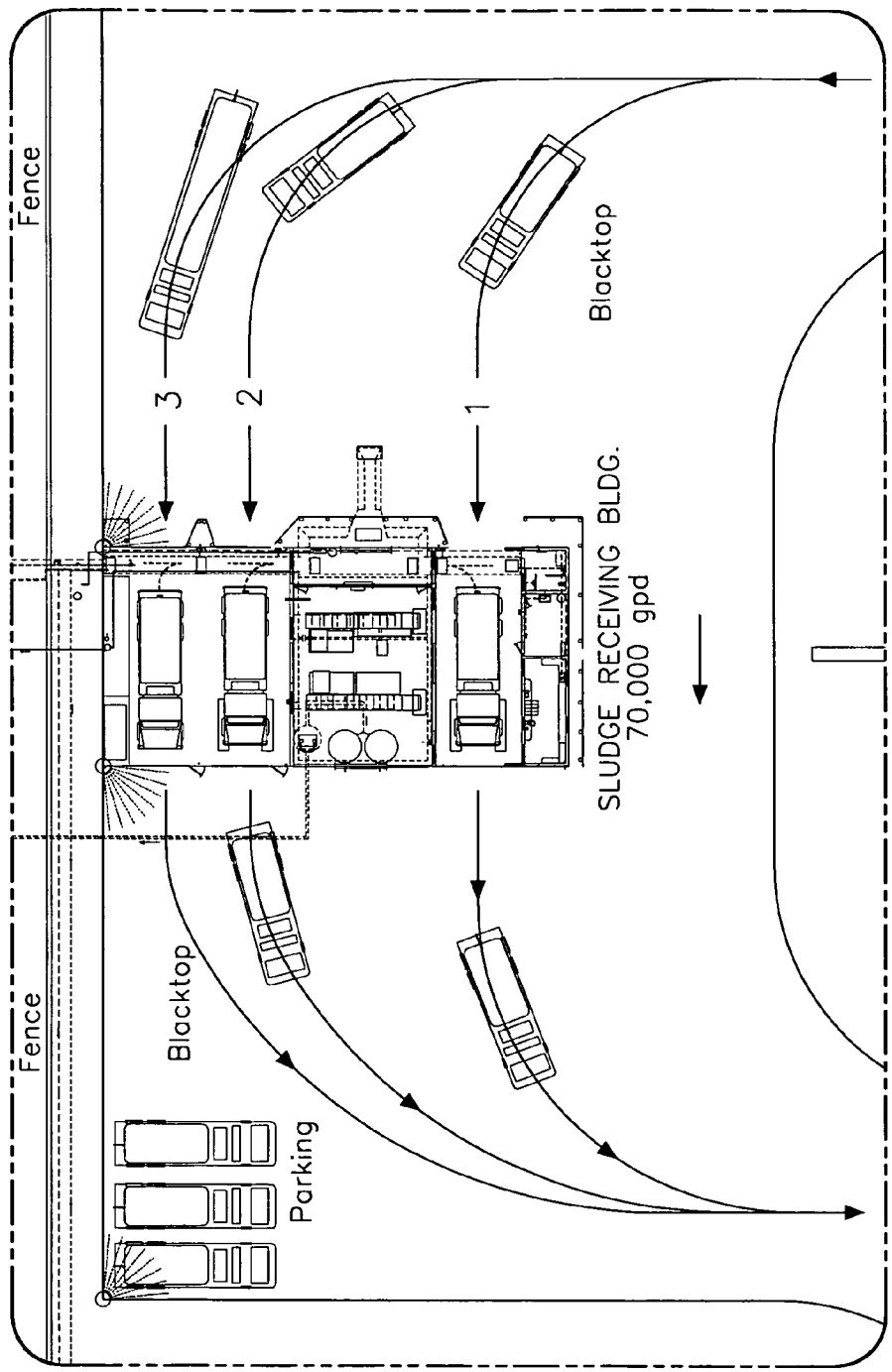
FIG. 8 is a detailed portion of a plant layout in accordance with one embodiment of the present invention.

FIG. 8 shows a detailed plan view of a portion of a preferred plant layout shown in FIG. 7. This shows the relative positions of the receiving station having the required receiving tanks and pumps as may be desired to accept and transmit the in-coming septage to the equalization ("transfer") tanks, as described herein. This Figure shows in-coming truck lanes, dumping stations, the coarse and fine screens and the associated equalization tanks, as well as the polymer and NaOH tanks and grinder, all contained within a sludge receiving building.

Figure 9:
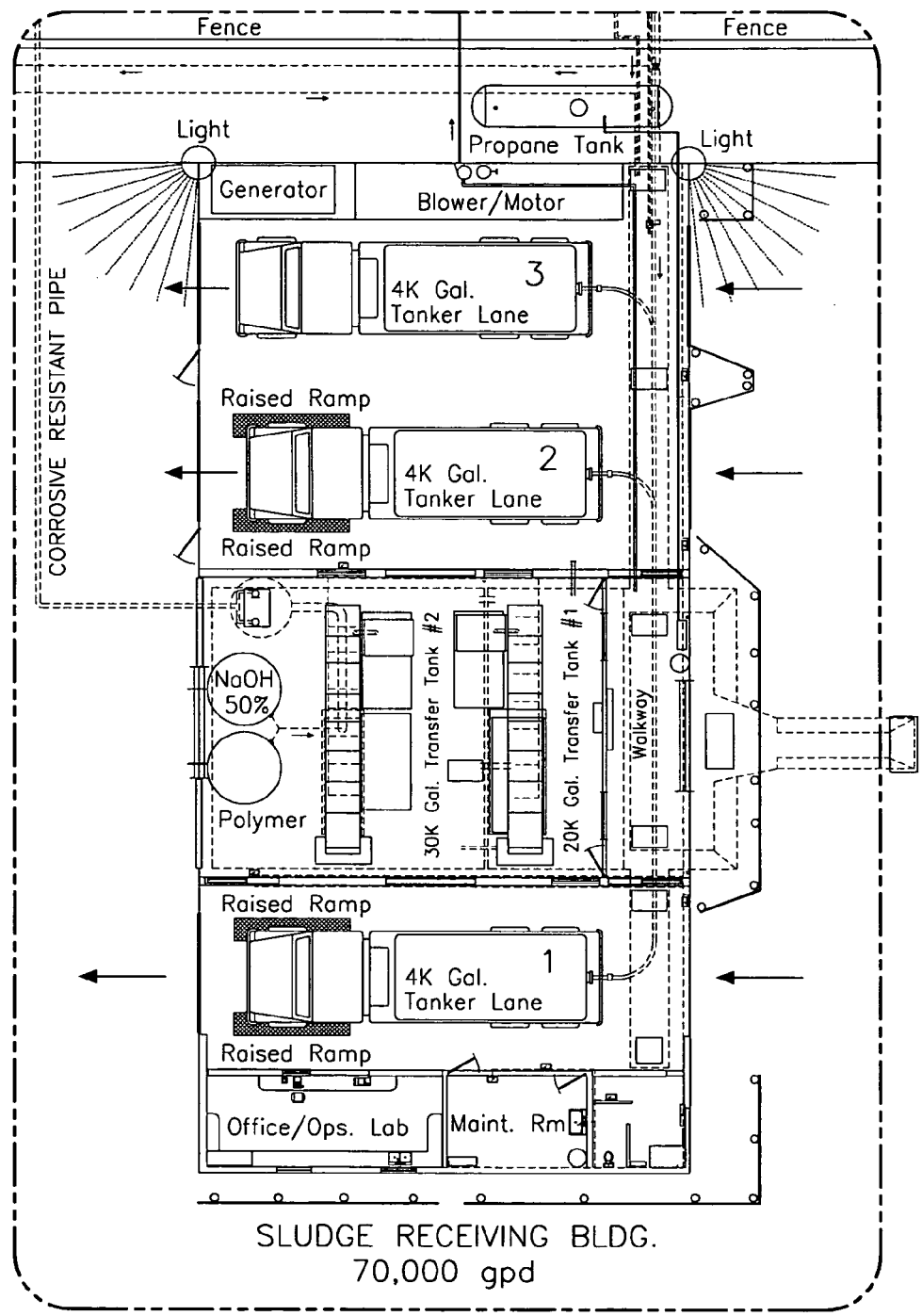
FIG. 9 is a detailed portion of a plant layout in accordance with one embodiment of the present invention.

FIG. 9 is a detailed view of FIG. 8.

Figure 10:
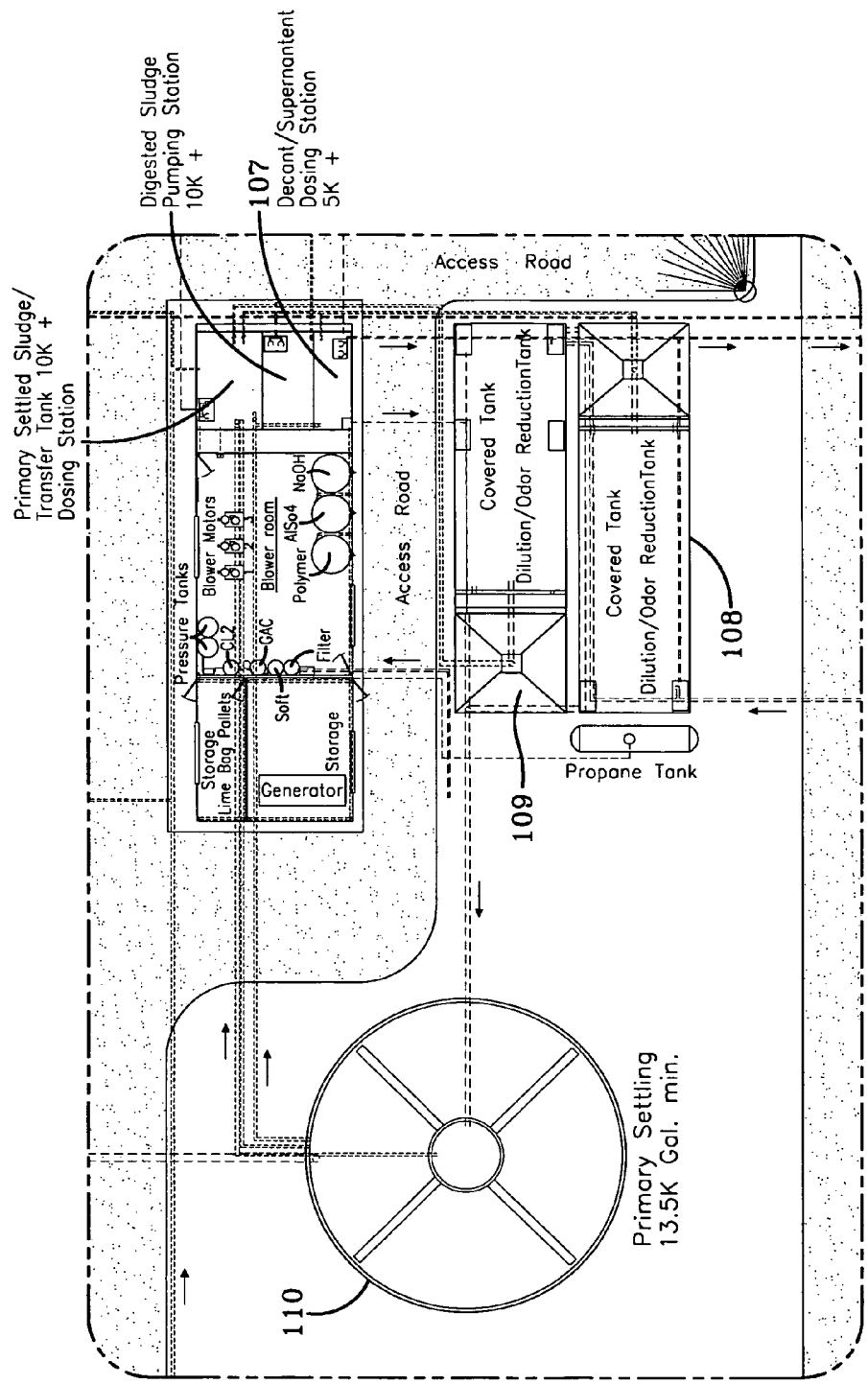
FIG. 10 is a detailed portion of a plant layout in accordance with one embodiment of the present invention.

FIG. 10 shows a detailed plan view of a portion of a preferred plant layout containing one of the constituent components shown in FIG. 6. This shows the relative positions of the primary settling tank, mixing/dilution/odor reduction tanks, chemical treatment components and pumping stations in the layout of the SSTP.

Figure 11:
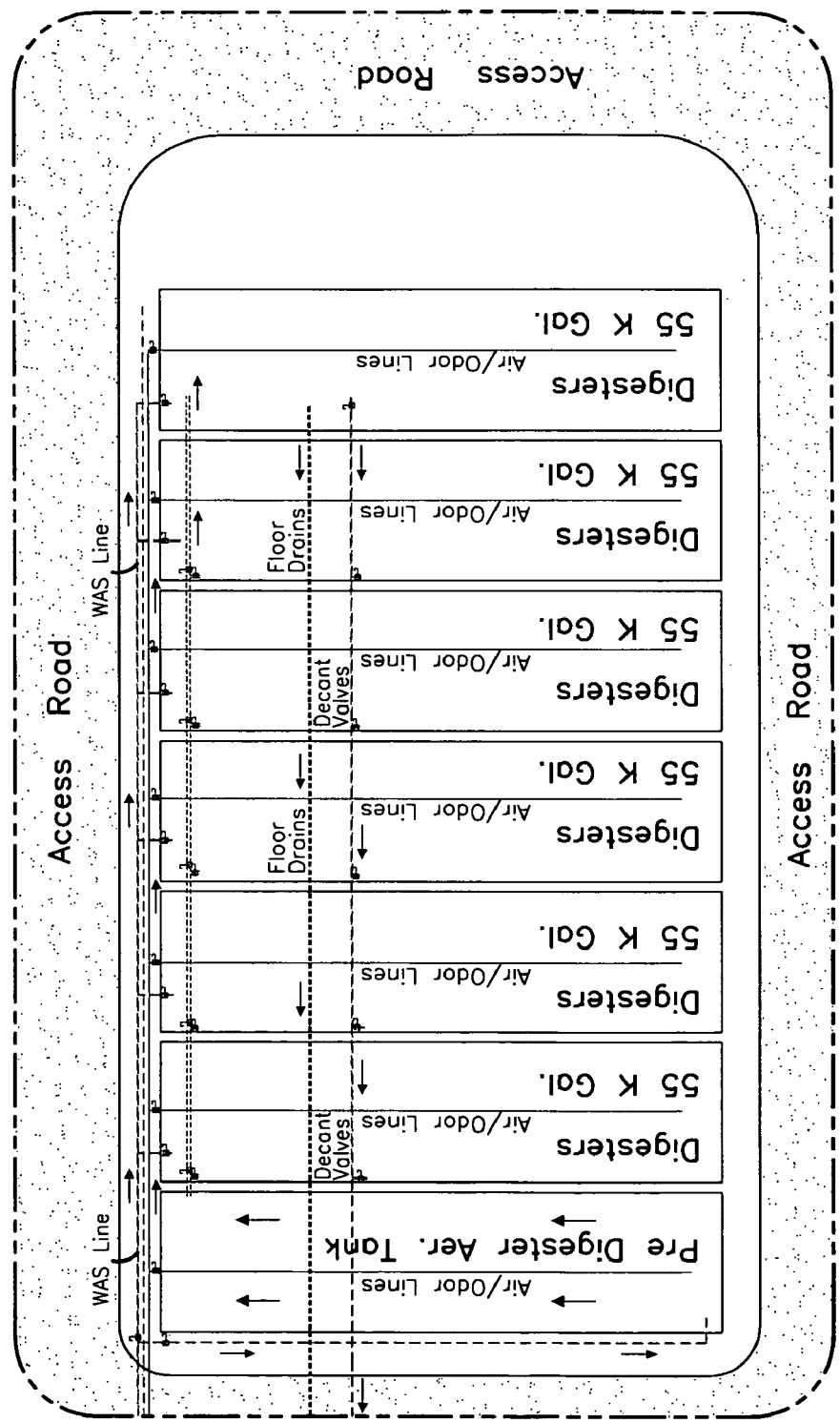
FIG. 11 is a detailed portion of a plant layout in accordance with one embodiment of the present invention.

FIG. 11 shows a detailed plan view of a portion of a preferred plant layout containing one of the constituent components shown in FIG. 6. This Figure shows a detailed view of the series of digesters with the associated waste activated sludge lines and valves allowing the digesters to be filed sequentially. This Figure also shows the decant valves, floor drains and air/odor lines. This also shows the relative positions of the pre-digester and digester tanks to the dilution/odor reduction tanks and the pumping stations in the layout of the SSTP when viewed in context in FIG. 6.

Figure 12:
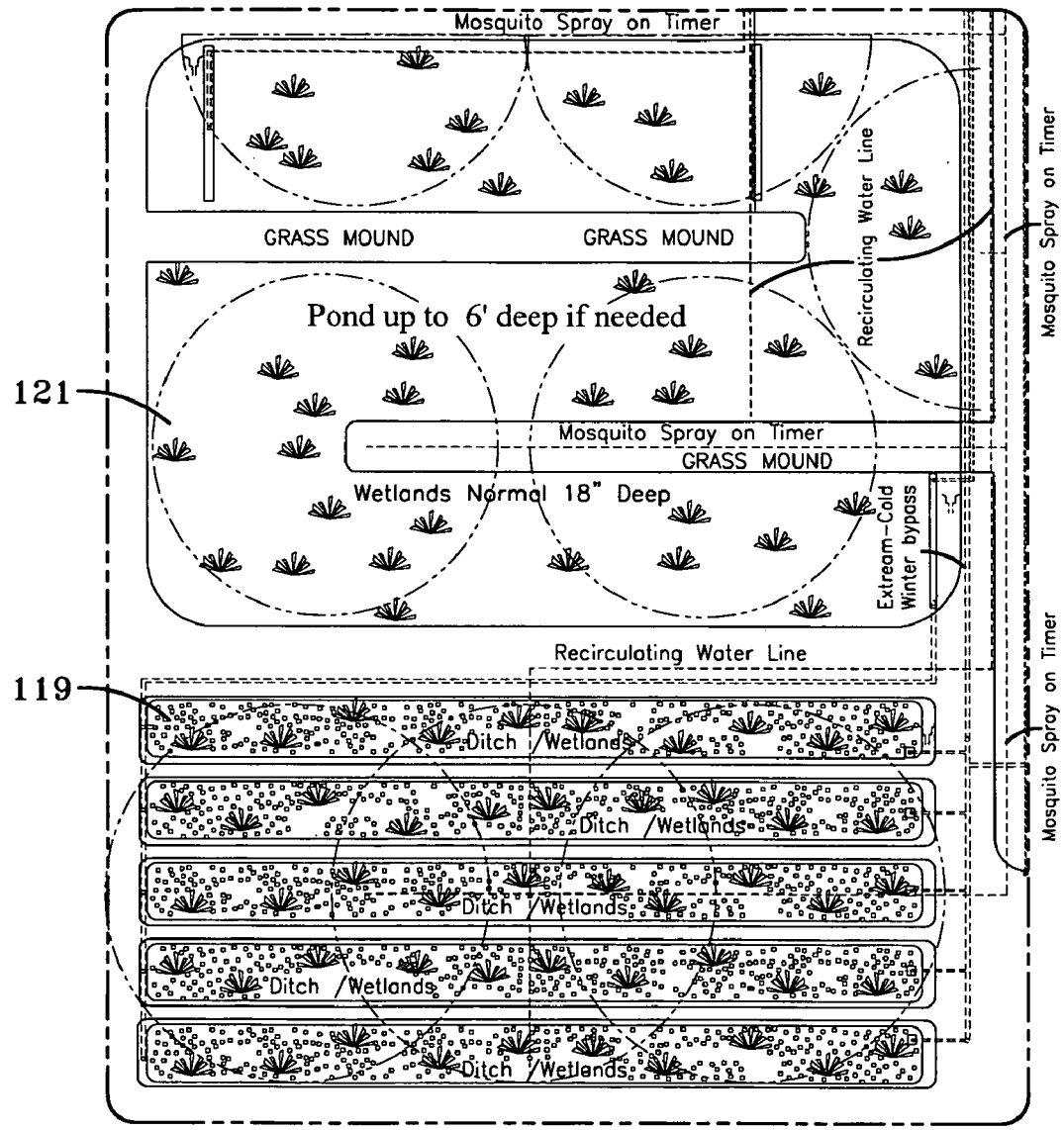
FIG. 12 shows a detailed portion of a plant layout in accordance with one embodiment of the present invention.

FIG. 12 shows a detailed plan view of a portion of a preferred plant layout containing one of the constituent components shown in FIG. 6. This shows the relative positions of the wetlands ditches, the wetlands ponds, and the associated recirculating water lines, preferred mosquito spray lines and cold weather by-pass line.

Figure 13:
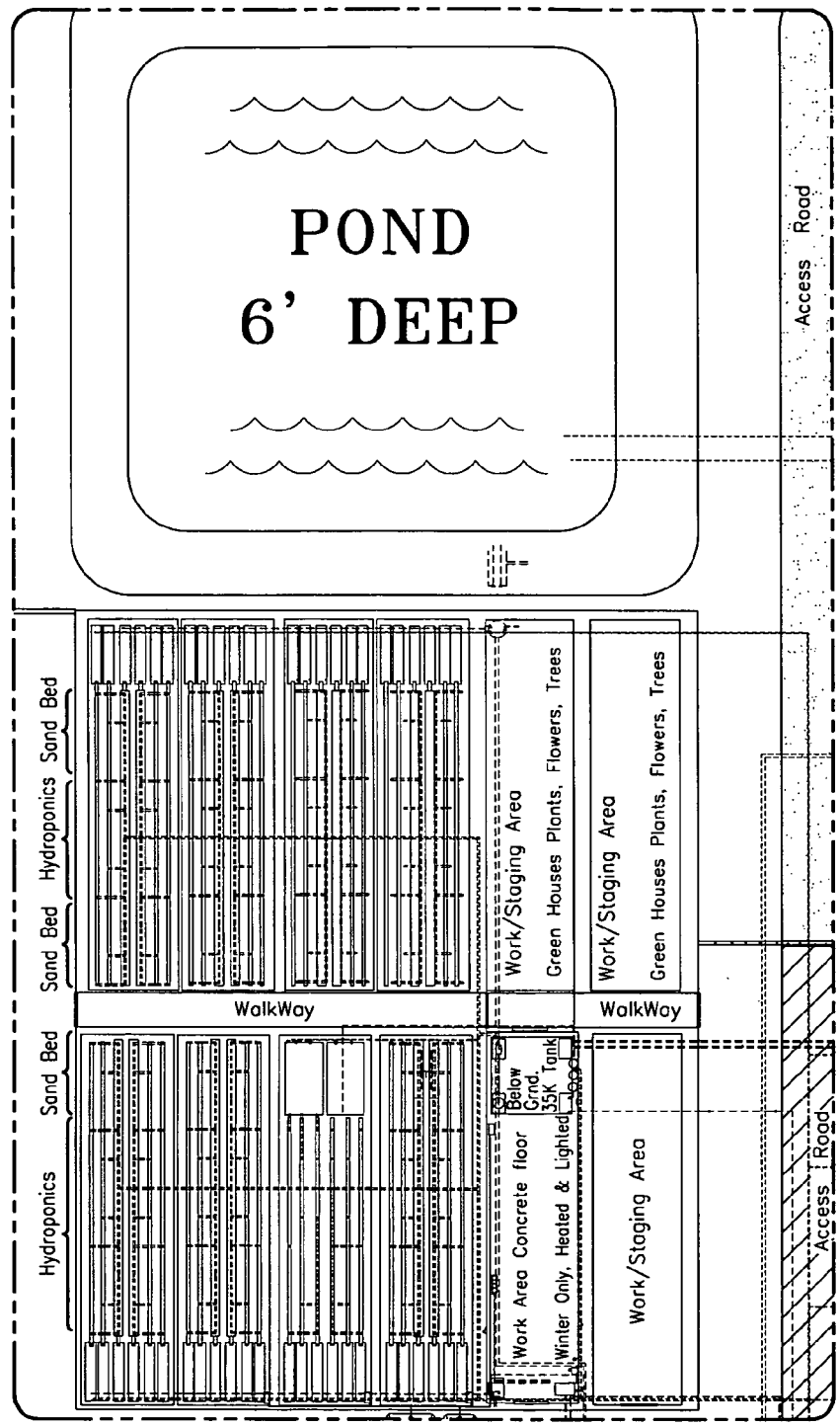
FIG. 13 shows a detailed portion of a plant layout in accordance with one embodiment of the present invention.

FIG. 13 shows a detailed plan view of a portion of a preferred plant layout containing some of the constituent components shown in FIG. 6. This shows the relative positions of one of the wetland ponds, the greenhouse and sand bed facility and associated conduits.

Figure 14:
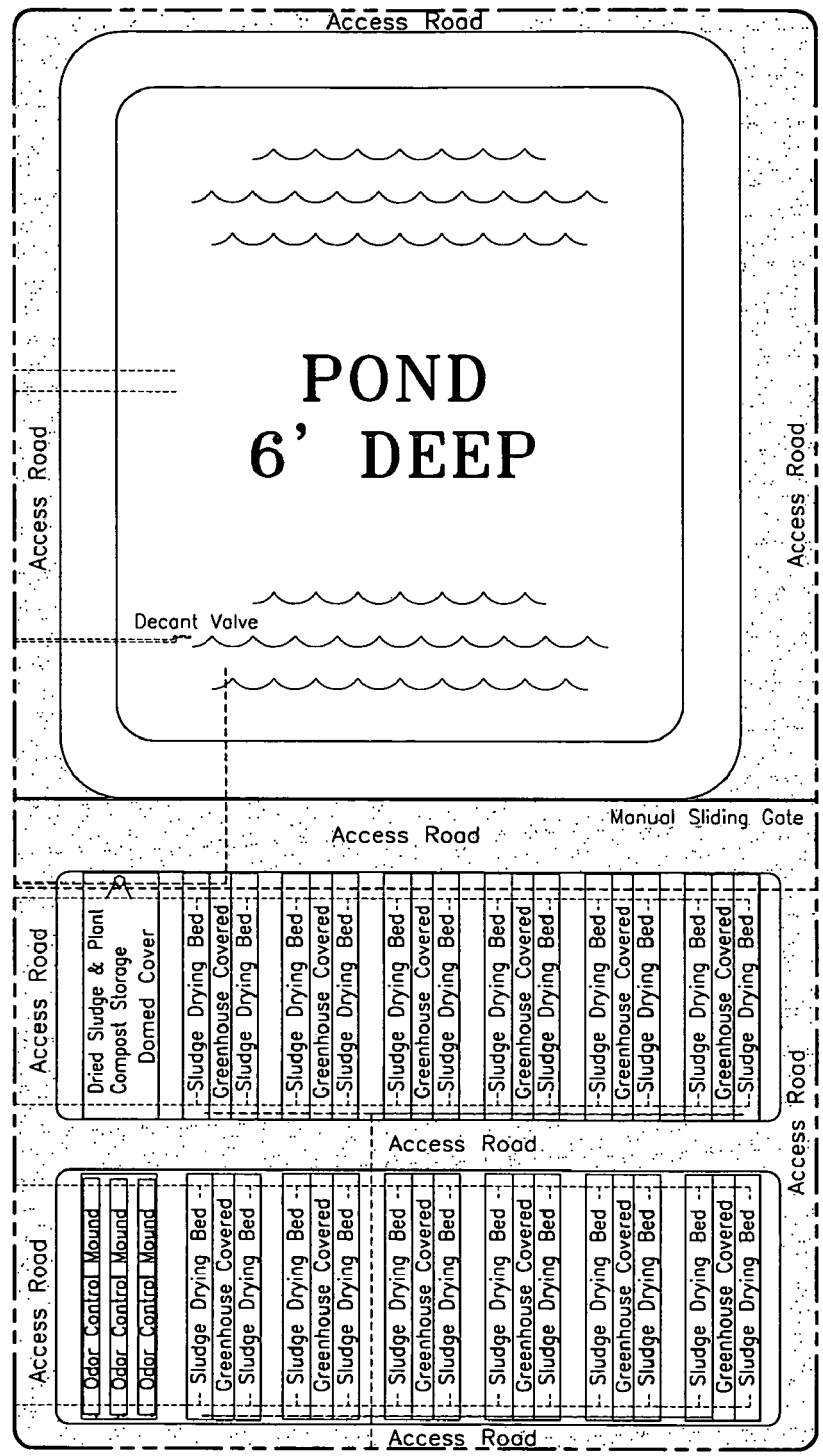
FIG. 14 shows a detailed portion of a plant layout in accordance with one embodiment of the present invention.

FIG. 14 shows a detailed plan view of a portion of a preferred plant layout containing some of the constituent components shown in FIG. 6. This Figure shows the relative positions of shows the relative positions of one of the wetland ponds, the sludge drying beds and associated conduits. This also shows the relative positions of one of the holding ponds and the banks of sludge drying beds in the layout of the SSTP.

This shows the relative positions of one of the holding ponds and the banks of sludge drying beds in the layout of the SSTP.

Figure 15:
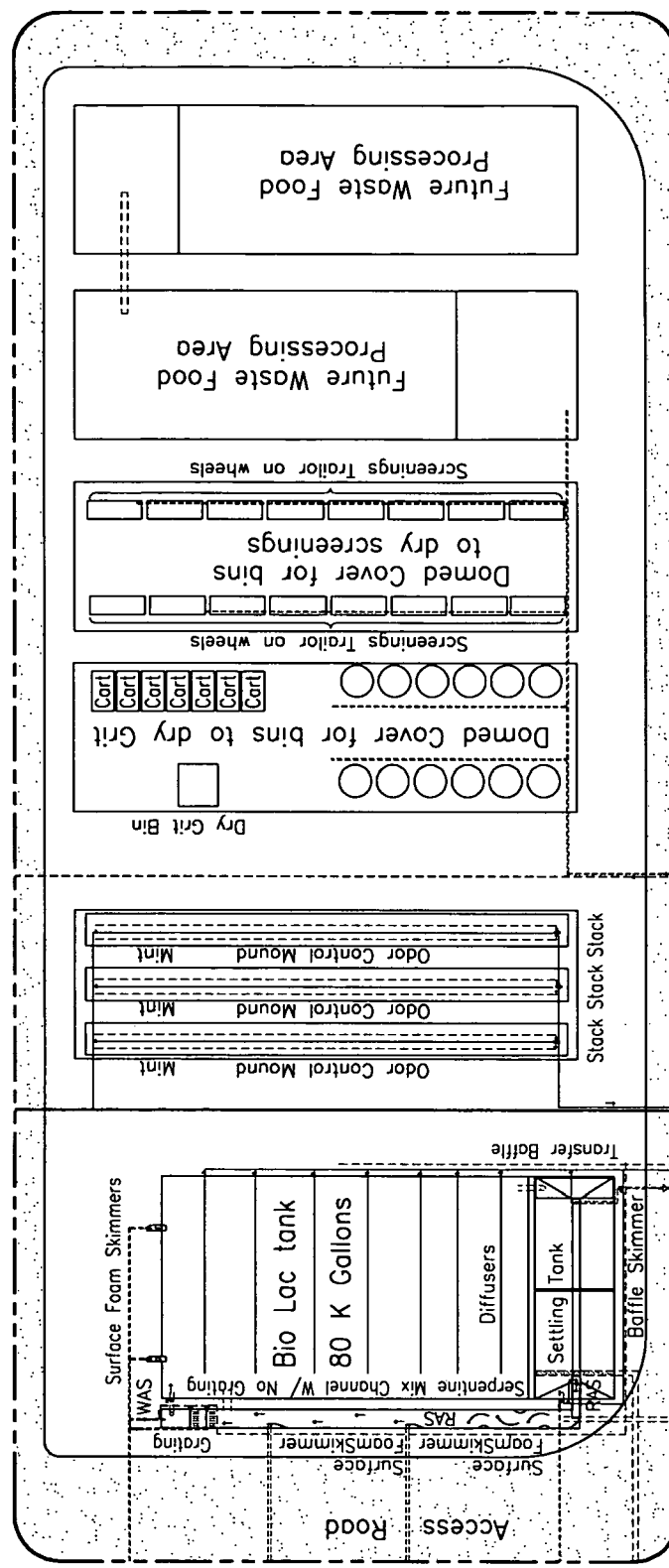
FIG. 15 shows a detailed portion of a plant layout in accordance with one embodiment of the present invention.

FIG. 15 shows a detailed plan view of a portion of a preferred plant layout containing one of the constituent components shown in FIG. 6. This Figure shows the relative positions of the Biolac tank, the odor control mounds and some of the sludge drying beds in the layout of the SSTP.

Figure 16:
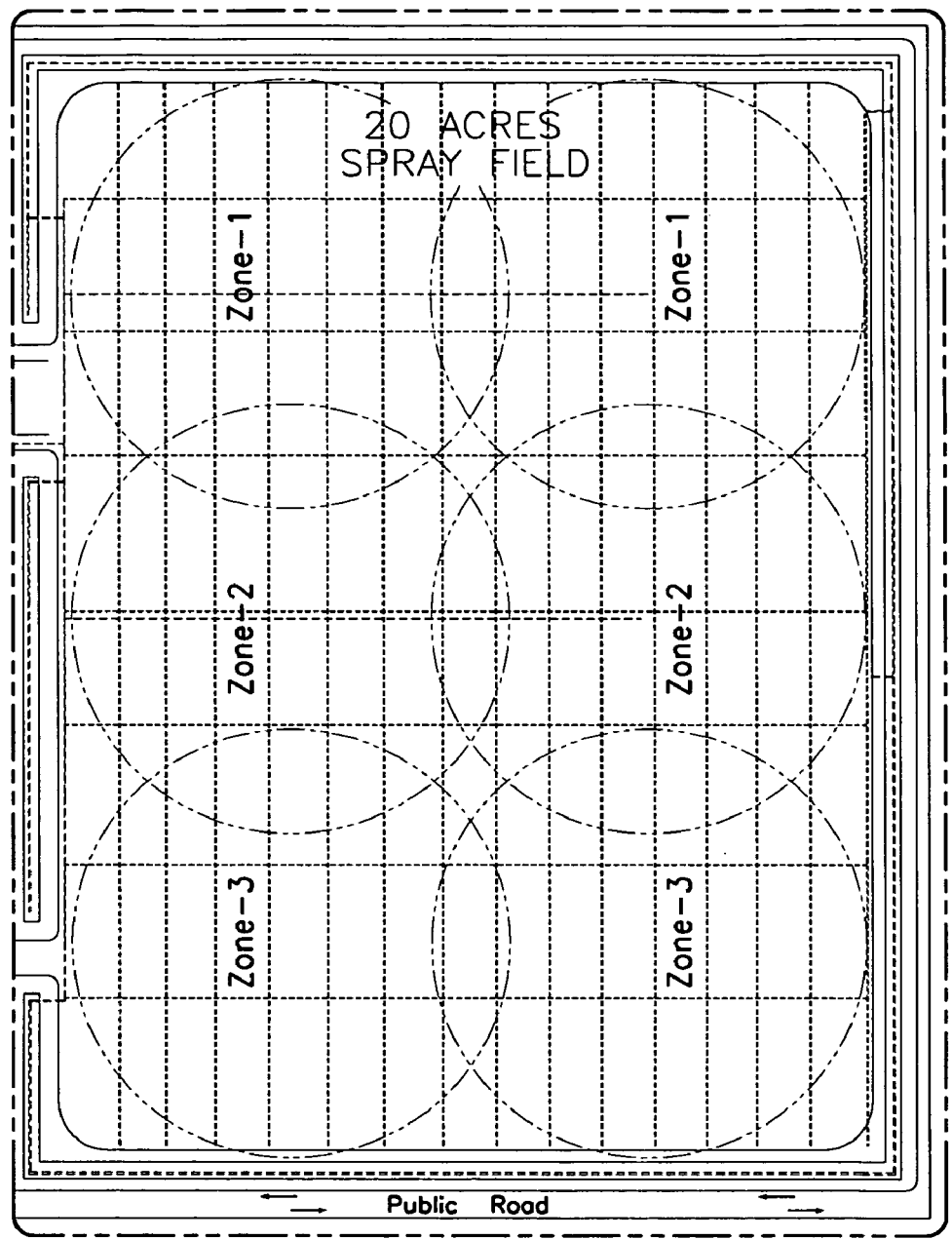
FIG. 16 shows a detailed portion of a plant layout in accordance with one embodiment of the present invention.

FIG. 16 shows a detailed plan view of a portion of a preferred plant layout containing one of the constituent components shown in FIG. 6. This Figure shows the relative positions of the spray fields in the layout of the SSTP.

Figure 17:
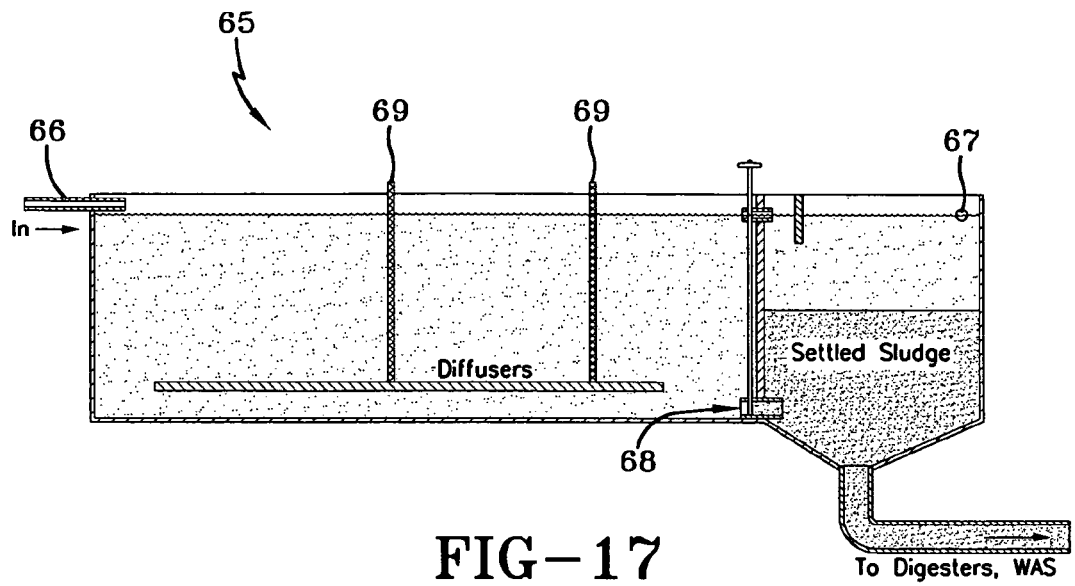
FIG. 17 shows a detailed elevation view of a mixing and odor control tank as used in accordance with one embodiment of the present invention.

FIG. 17 shows a detailed elevation view of a mixing and odor control tank as used in accordance with one embodiment of the present invention. FIG. 13 shows mixing and odor tank 65 which appears in the system for instance as items 8 and 9. FIG. 13 shows input conduit 66 which conducts the septage to be treated into mixing and odor tank 65 which is maintained at a tank water level as shown. FIG. 13 also shows sluice gate 68 and output conduit 67 which serves to remove the supernatant. The mixing portion of the mixing and odor tank 65 contains diffusers 69, such as air diffusers that stir the septage while in the initial portion of the tank. The air may be taken from the sealed E.Q. tanks 2 and 4 which is conducted via air lines to the covered mixing and odor tank, such as by action of blower 51 to pipes 52 serving both mixing and odor tanks 8 and 9 through an injection diffuser, as described herein.

From there, the sludge is settled and allowed to pass through the transfer pipe 68 to settle in the downstream portion of the tank as shown. The settled sludge is evacuated as waste activated sludge (WAS) to the digester bank as described herein. The supernatant effluent is removed by output conduit 67 and in the case of the first mixing and odor tank 8 is sent to mixing and odor tank 9, and in the case of mixing and odor tank 9 is sent to the primary settling tank 10 as described herein.

In the preferred embodiment, where the volume of second settling tank has a volume of 2x, the first settling tank has a volume of 2x and the primary settling tank 10 has a volume of 4x. It is also preferred that the relative resident time of the first settling tank, the second settling tank and the primary settling tank is 1:2:4.

Figure 18:
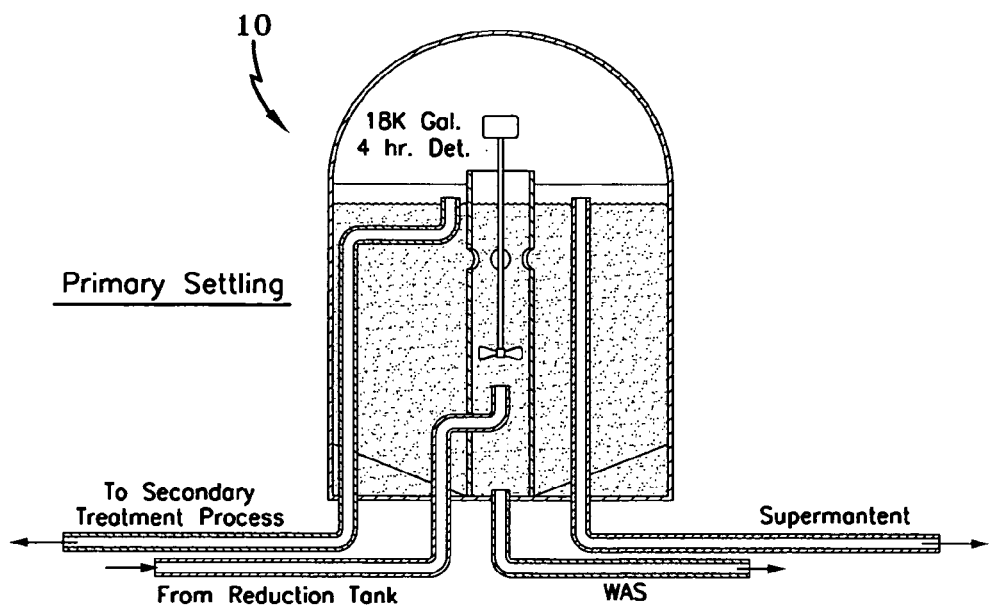
FIG. 18 shows a detailed elevation view of a primary settling tank as used in accordance with one embodiment of the present invention.
Figure 19:
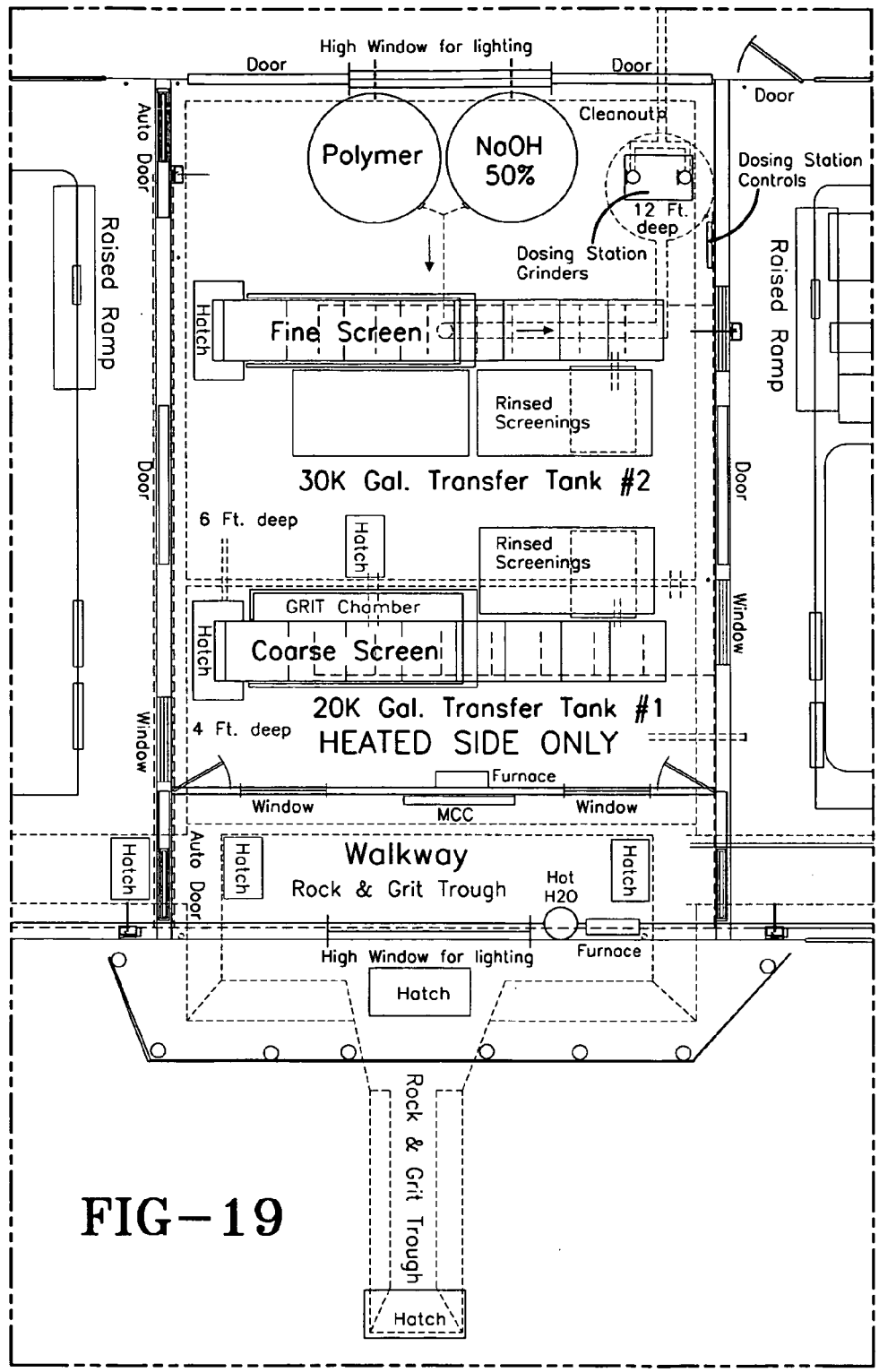
FIG. 19 is a detailed portion of the plant layout as shown in FIG. 9.

FIG. 18 shows a detailed elevation view of a primary settling tank 10 as used in accordance with one embodiment of the present invention. FIG. 14 shows the conduits (1) from the odor reduction tank, (2) to the secondary treatment process, (3) to remove waste activated sludge and (4) to remove supernatant.

FIG. 5 shows a schematic of a preferred plant layout containing the constituent components shown in FIGS. 1-4 with additional odor control elements. This shows a proposed preferred property layout of the SSTP.

FIG. 6 shows a plan view of a preferred plant layout containing the constituent components shown schematically in FIGS. 1-5. This shows a proposed preferred property layout of the SSTP.

FIG. 7 shows a detailed plan view of a portion of a preferred plant layout containing most of the constituent components shown in FIG. 6, and making reference to further detailed FIGS. 8-15.

FIG. 8 shows a detailed plan view of a portion of a preferred plant layout shown in FIG. 7. This shows the relative positions of the receiving station having the required receiving tanks and pumps as may be desired to accept and transmit the in-coming septage to the equalization ("transfer") tanks, as described herein. This Figure shows in-coming truck lanes, dumping stations, the coarse and fine screens and the associated equalization tanks, as well as the polymer and NaOH tanks and grinder, all contained within a sludge receiving building.

FIG. 9 is a detailed view of FIG. 8.

FIG. 10 shows a detailed plan view of a portion of a preferred plant layout containing one of the constituent components shown in FIG. 6. This shows the relative positions of the primary settling tank, mixing/dilution/odor reduction tanks, chemical treatment components and pumping stations in the layout of the SSTP.

FIG. 11 shows a detailed plan view of a portion of a preferred plant layout containing one of the constituent components shown in FIG. 6. This Figure shows a detailed view of the series of digesters with the associated waste activated sludge lines and valves allowing the digesters to be filed sequentially. This Figure also shows the decant valves, floor drains and air/odor lines. This also shows the relative positions of the pre-digester and digester tanks to the dilution/odor reduction tanks and the pumping stations in the layout of the SSTP when viewed in context in FIG. 6.

FIG. 12 shows a detailed plan view of a portion of a preferred plant layout containing one of the constituent components shown in FIG. 6. This shows the relative positions of the wetlands ditches, the wetlands ponds, and the associated recirculating water lines, preferred mosquito spray lines and cold weather by-pass line.

FIG. 13 shows a detailed plan view of a portion of a preferred plant layout containing some of the constituent components shown in FIG. 6. This shows the relative positions of one of the wetland ponds, the greenhouse and sand bed facility and associated conduits.

FIG. 14 shows a detailed plan view of a portion of a preferred plant layout containing some of the constituent components shown in FIG. 6. This Figure shows the relative positions of shows the relative positions of one of the wetland ponds, the sludge drying beds and associated conduits. This also shows the relative positions of one of the holding ponds and the banks of sludge drying beds in the layout of the SSTP.

This shows the relative positions of one of the holding ponds and the banks of sludge drying beds in the layout of the SSTP.

FIG. 15 shows a detailed plan view of a portion of a preferred plant layout containing one of the constituent components shown in FIG. 6. This Figure shows the relative positions of the Biolac tank, the odor control mounds and some of the sludge drying beds in the layout of the SSTP.

FIG. 16 shows a detailed plan view of a portion of a preferred plant layout containing one of the constituent components shown in FIG. 6. This Figure shows the relative positions of the spray fields in the layout of the SSTP.

FIG. 17 shows a detailed elevation view of a mixing and odor control tank as used in accordance with one embodiment of the present invention. FIG. 13 shows mixing and odor tank 65 which appears in the system for instance as items 8 and 9. FIG. 13 shows input conduit 66 which conducts the septage to be treated into mixing and odor tank 65 which is maintained at a tank water level as shown. FIG. 13 also shows sluice gate 68 and output conduit 67 which serves to remove the supernatant. The mixing portion of the mixing and odor tank 65 contains diffusers 69, such as air diffusers that stir the septage while in the initial portion of the tank. The air may be taken from the sealed E.Q. tanks 2 and 4 which is conducted via air lines to the covered mixing and odor tank, such as by action of blower 51 to pipes 52 serving both mixing and odor tanks 8 and 9 through an injection diffuser, as described herein.

From there, the sludge is settled and allowed to pass through the transfer pipe 68 to settle in the downstream portion of the tank as shown. The settled sludge is evacuated as waste activated sludge (WAS) to the digester bank as described herein. The supernatant effluent is removed by output conduit 67 and in the case of the first mixing and odor tank 8 is sent to mixing and odor tank 9, and in the case of mixing and odor tank 9 is sent to the primary settling tank 10 as described herein.

In the preferred embodiment, where the volume of second settling tank has a volume of 2x, the first settling tank has a volume of 2x and the primary settling tank 10 has a volume of 4x. It is also preferred that the relative resident time of the first settling tank, the second settling tank and the primary settling tank is 1:2:4.

FIG. 18 shows a detailed elevation view of a primary settling tank 10 as used in accordance with one embodiment of the present invention. FIG. 14 shows the conduits (1) from the odor reduction tank, (2) to the secondary treatment process, (3) to remove waste activated sludge and (4) to remove supernatant.

The person of ordinary skill in the art, given the benefit of this disclosure, will recognize that the exemplary waste treatment systems discussed herein allow for reduced power requirements, reduced operating personnel, more efficient and constant daily operation as well as more continuous operation under inclement weather conditions, reduced odor, and additional results not typically achieved with existing waste treatment systems.

While the invention has been described in connection with a specific illustrative embodiment thereof, it will be understood that it is capable of further modifications and this application is intended to cover any variations, uses, or alterations of the invention. In general, the principles of the invention and including such departures from the present disclosure as come within known or customary practice within the art to which the invention pertains and as may be applied to the essential features hereinbefore set forth and as follows in the scope of the appended claims. For instance, the system may be modified such as by variations in volume and retention and treatment times of each of the subsystems, overall volume throughput, and individual and complete system operation cycles and their coordination.

Various other changes, omissions and additions in the form and detail of the present invention may be made therein without departing from the spirit and scope of the invention. Therefore, the above description should not be construed as limiting, but merely as exemplification of the various embodiments.

It will be apparent that while specific embodiments of the invention are disclosed, various modifications of the system and apparatus or parameters of the process may be made which will be within the spirit and scope of the invention. Therefore the spirit and scope of the present invention should be determined by reference to the claims below.

What is claimed is:

1. A septage treatment system comprising:
  (a) An augmented primary treatment process system comprising:
    1. a receiving station adapted to receive septage from a vehicle and to pump said septage;
    2. at least one equalization tank adapted to receive septage from said receiving station;
    3. at least two mixing and odor control tanks adapted to receive septage from said at least one equalization tank, and to generate waste activated sludge; and
  a primary settling tank adapted to receive effluent from said mixing and odor control tanks, and to generate waste activated sludge;

(a) a secondary treatment process system adapted to receive comprising:
  1. at least one aeration tank adapted to receive waste activated sludge from said primary treatment process system and to generate water effluent; and
(b) a tertiary treatment process system comprising at least one water treatment device adapted to receive water effluent from said aeration tank and selected from the group consisting of: (a) wetland ditches; (b) wetland ponds and (c) aquaculture hydroponics and sand bed greenhouses.

2. A septage treatment system according to claim 1, wherein said tertiary treatment process system comprises:
  (a) at least one wetland ditch adapted to receive water effluent from said aeration tank and to generate filtered water effluent;
  (b) at least one wetland pond adapted to receive filtered water effluent from said at least one wetland ditch and to generate filtered water effluent; and
  (c) an aquaculture hydroponics and sand bed greenhouse adapted to receive filtered water effluent from said at least one wetland pond and to generate filtered water effluent.

3. A septage treatment system according to claim 1, additionally comprising a secondary settling treatment tank and wherein said primary settling tank is adapted to separate waste activated sludge from said effluent received from said mixing and odor control tanks, and to provide supernatant to said secondary settling treatment tank.

4. A septage treatment system according to claim 3, additionally comprising a lift station that accepts filtered water effluent from said wetland pond and supplies said filtered water effluent to said aquaculture hydroponics and sand bed greenhouse.

5. A septage treatment system according to claim 1, additionally comprising a storage pond and a holding tank and pump station that accepts filtered water effluent from said aquaculture hydroponics and sand bed greenhouse and a conduit to conduct said filtered water effluent from said holding tank and pump station to said storage pond, and wherein said storage pond is connected to said wetland pond by a fluid conduit.

6. A septage treatment system according to claim 5, additionally comprising a spray field and a water filtration system that accepts filtered water effluent from said holding tank and pump station and a conduit to conduct said filtered water effluent from said water filtration system to said spray field.

7. A septage treatment system according to claim 1, additionally comprising a series of sludge drying beds and a series of digester tanks adapted to receive said waste activated sludge from said at least two mixing and odor control tanks and from said at least one primary settling tank, and to generate digested sludge and decant water therefrom, and a conduit to conduct said digested sludge to said series of sludge drying beds.

8. A septage treatment system according to claim 7, wherein said series of sludge drying beds generate dried solids and additionally comprising a compost mound, and a transporter to transport said dried solids to said compost mound.

9. A septage treatment system according to claim 7, additionally comprising a mobile sludge press and a series of digester tanks adapted to receive said waste activated sludge generated by said at least two mixing and odor control tanks and from said at least one equalization tank, and to generate digested sludge and decant water therefrom, and a conduit to conduct said digested sludge to said mobile sludge press.

10. A septage treatment system according to claim 1, wherein said at least one equalization tank comprises a first and second equalization tank disposed in a fluid communication path, a coarse screen disposed between said first and second equalization tank, and a fine screen disposed downstream of said second equalization tank.

11. A septage treatment system according to claim 1, additionally comprising an odor control mound and a conduit to conduct air from said at least one equalization tank through said odor control mound.

12. A septage treatment system according to claim 1, wherein said at least two mixing and odor control tanks comprise a conduit adapted to supply fresh air.

13. A septage treatment system according to claim 1, additionally comprising:
  (a) at least one equalization tank adapted to receive septage from said receiving station; and
  (b) at least one screen adapted to receive septage from said at least one equalization tank; wherein said at least two mixing and odor control tanks are adapted to receive screened septage from said at least one equalization tank, and to generate waste activated sludge.

14. A septage treatment system according to claim 13, wherein said at least one equalization tank and said at least one screen additionally comprising:
  (a) a first equalization tank adapted to receive septage from said receiving station;
  (b) a first screen adapted to receive septage from said first equalization tank;
  (c) a second equalization tank adapted to receive septage from said first screen;
  (d) a second screen adapted to receive septage from said second equalization tank; wherein said at least two mixing and odor control tanks are adapted to receive screened septage from said second equalization tank, and to generate waste activated sludge.

15. A septage treatment system according to claim 1, wherein each said mixing and odor control tanks comprise a settling portion.

16. A septage treatment system according to claim 1, wherein said mixing and odor control tanks comprise a first and second mixing and odor control tank wherein said first mixing and odor control tank is adapted to have a residence time less than said second mixing and odor control tank.

17. A septage treatment system according to claim 16, wherein said mixing and odor control tanks comprise a first and second mixing and odor control tank wherein said first mixing and odor control tank is adapted to have a residence time less than said second mixing and odor control tank, and wherein said primary settling tank has a residence time greater than said second mixing and odor control tank.

18. A septage treatment system according to claim 16, wherein the ratio of the residence time of said first mixing and odor control tank to the residence time of said second mixing and odor control tank to the residence time is about 1:2:4.

* * * * *